United States Patent [19]

Wolff et al.

[11] Patent Number: 4,715,786
[45] Date of Patent: Dec. 29, 1987

[54] CONTROL METHOD AND APPARATUS FOR PERISTALTIC FLUID PUMP

[75] Inventors: Donald L. Wolff, Barrington; Porter T. McCauley, Northfield; Paul Stiefel, Skokie; Gyoergy J. Takacs, Wheeling; Roman A. Adams, Lincolnshire, all of Ill.

[73] Assignee: Cole-Parmer Instrument Company, Chicago, Ill.

[21] Appl. No.: 682,031

[22] Filed: Dec. 14, 1984

[51] Int. Cl.⁴ .............................................. F04B 49/06
[52] U.S. Cl. ...................................... 417/22; 417/45; 417/53; 364/510
[58] Field of Search .................... 364/510; 417/22, 42, 417/45, 53, 477; 73/863.01; 604/65, 67, 153

[56]  References Cited
U.S. PATENT DOCUMENTS

| 2,759,633 | 8/1956 | Ross . | |
|---|---|---|---|
| 2,826,067 | 3/1958 | Braunlich . | |
| 2,966,175 | 12/1960 | Hyde . | |
| 3,011,684 | 12/1961 | Corneil . | |
| 3,565,286 | 2/1971 | Latham, Jr. | 417/477 |
| 3,756,292 | 9/1973 | Croslin et al. . | |
| 3,756,456 | 9/1973 | Georgi . | |
| 3,768,510 | 10/1973 | Reves . | |
| 3,779,457 | 12/1973 | Cornyn, Jr. et al. . | |
| 3,839,627 | 10/1974 | Grant et al. . | |
| 3,845,288 | 10/1974 | Cornyn, Jr. et al. . | |
| 3,872,723 | 3/1975 | Busch . | |
| 3,877,287 | 4/1975 | Duntz, Jr. . | |
| 3,887,110 | 6/1975 | Porter . | |
| 3,935,971 | 2/1976 | Papoff et al. . | |
| 3,940,971 | 3/1976 | Krause et al. . | |
| 4,073,304 | 2/1978 | Lerner et al. . | |
| 4,171,638 | 10/1979 | Coman et al. . | |
| 4,210,138 | 7/1980 | Jess et al. | 417/477 |
| 4,266,426 | 5/1981 | Gandini . | |
| 4,307,601 | 12/1981 | Jackson . | |
| 4,331,262 | 5/1982 | Snyder et al. . | |
| 4,352,636 | 10/1982 | Patterson et al. | 417/45 |
| 4,389,886 | 6/1983 | Korczak . | |
| 4,447,191 | 5/1984 | Bilstad et al. | 417/45 |
| 4,498,843 | 2/1985 | Schneider et al. | 417/22 |
| 4,534,706 | 8/1985 | Palm et al. | 417/42 |
| 4,604,034 | 8/1986 | Wheeldon et al. | 604/67 |

FOREIGN PATENT DOCUMENTS 2532033  2/1977  Fed. Rep. of Germany .
2272899 12/1975  France .
 943330  5/1962  United Kingdom .

Primary Examiner—Parshotam S. Lall
Attorney, Agent, or Firm—Fitch, Even, Tabin & Flannery

[57] ABSTRACT

A peristaltic pump controller which provides control of a positive displacement pump as either an uncalibrated or calibrated flowmeter, or a calibrated dispenser. A calibration constant is calculated, after the pump is primed, to determine the amount of volume output produced by an increment of angular rotation of the pump. The constant is determined during a calibration operation where an arbitrary calibration volume is metered. The controller has a low flow and high flow mode where the low flow mode provides a higher resolution for dispensing. The flow mode of operation is determined by the value of the calibration constant and is automatically set when the constant is calculated. During a dispensing operation, the controller will meter fluid to within a predetermined amount of the final volume dependent upon the speed of the pump motor and then dribble in the remaining amount of a batch for precision.

20 Claims, 19 Drawing Figures

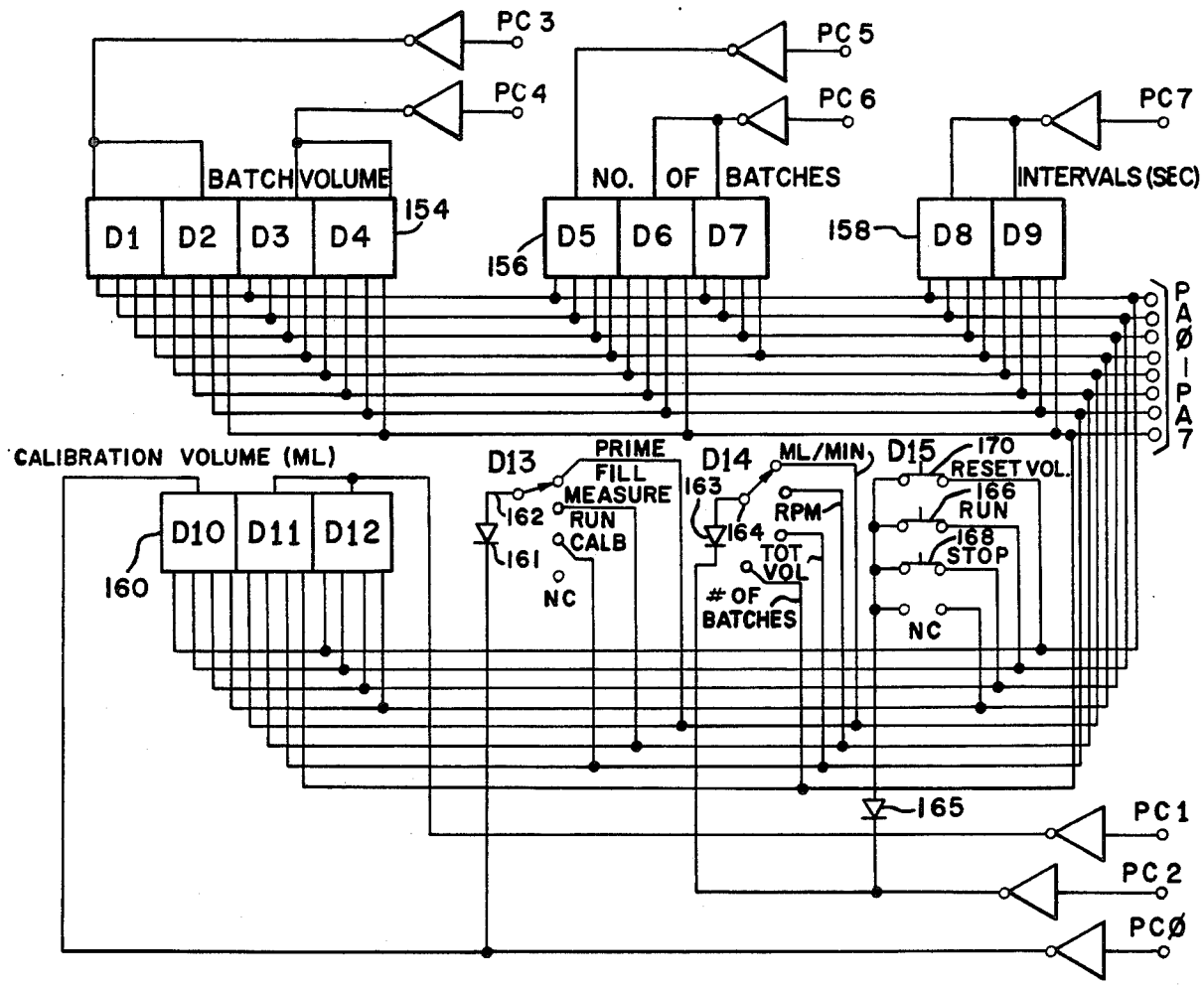
FIG. 5
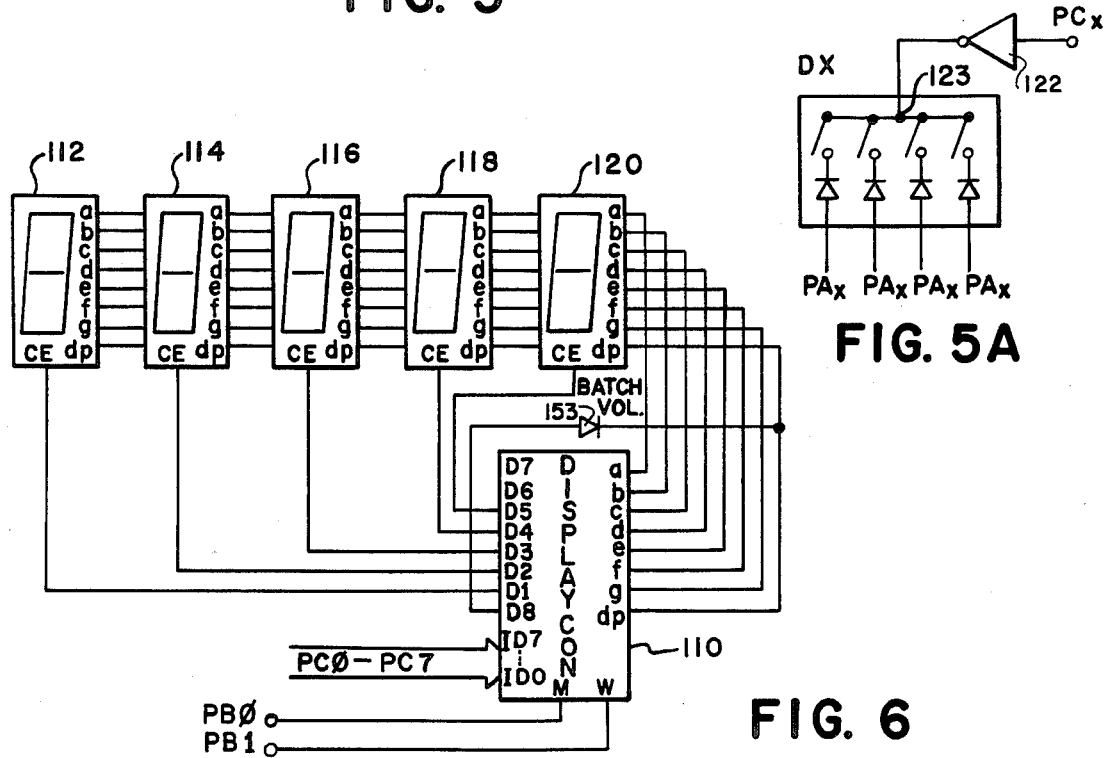
FIG. 5A
FIG. 6

CONTROL METHOD AND APPARATUS FOR PERISTALTIC FLUID PUMP

REFERENCE TO MICROFICHE APPENDIX

An accompanying appendix of software listings of one microfiche card having a total number of 49 frames is hereby referenced and expressly made part of this application.

The present invention pertains generally to positive displacement fluid pumps, and is more particularly directed to a control method and apparatus for a peristaltic pump which provides control of the pump as either a flow meter or as a dispenser.

Fluid pumps of the peristaltic type which operate to provide a moving region or regions of compression along the length of a compressible fluid conduit or tube are generally known. Movement of the compressed region of the tubular conduit forces fluid ahead of the moving region, and the action of the tube in returning to its uncompressed condition creates a partial vacuum which effects forward flow of the fluid from the region behind the compressed region. These pumps are termed positive displacement pumps because, for every angular displacement of the pump head, a known quantity of fluid is pumped and thus the flow rate of the pumps are directly related to their speed. Examples of peristaltic pumps of this type are illustrated in U.S. Pat. No. 3,358,609 and U.S. Pat. No. 4,211,519 which are commonly assigned with the present application and the disclosure of which is expressly incorporated by reference.

Peristaltic pumps because of their positive displacement characteristics have varied uses and find particular application where it is desired to provide measured fluid flow and dispensing. However, in the past, it has been difficult to provide accurate fluid flow measurement and accurate and repeatable volume dispensing from these types of pumps. A calibration process is a necessary step to providing accurate measurement where the volume rate of the pump as a function of velocity is measured. When these pumps have been calibrated in the past, it was considered necessary to recalibrate the pump after a motor speed change because to simplify the calibration process only one speed was used. It is advantageous to be able to vary the motor speed, perhaps for shortening the time necessary to dispense large numbers of high volume batches, and this flexibility has been lost in these types of apparatus.

In addition to the problem of maintaining calibration during motor speed changes, the prior pumps have had difficulties with accurately determining the flow rate and measuring exact volumes of fluids. One of the problems associated with the accuracy of the previous pumps has been the error produced by calculations of a controller. Generally, the calculation of flow rate or the dispensing of an accurate volume requires a calculation using a multiplication or a division. In discrete circuitry, errors due to scaling factors and parameter variances make this calculation relatively inaccurate. Alternatively, for digital circuits the round-off error in the floating point calculations of a small microprocessor or discrete digital control are basically unacceptable.

SUMMARY OF THE INVENTION

Accordingly, it is an object of the present invention to provide a control for a peristaltic pump which can be used for a dual operation, either as a flow meter or as a dispenser. The accuracy of the control is enhanced by the direct measurement of parameters relating to volume dispensed, motor speed, and flow rate. These direct readings are accumulated in a plurality of counters which are updated on a real time basis. The contents of the counters can be used to increment other counters and can be reset at particular real time intervals. By accumulating exact counts relating to volume, motor speed, and time, the parameters of flow rate, revolutions per minute and cumulative volume may be accurately and precisely calculated directly without using intermediate calculations including floating point multiplications and divisions.

One aspect of the invention includes a calibration operation where a calibration constant relating known increments of angular rotation of the pump to a known fluid volume is determined. Because the pump is a positive displacement apparatus, this constant can be used to determine flow rate and total or cumulative volume accurately by counting angular increments of pump rotation which can be accurately measured. As an advantage, because the calibration constant does not use the speed of the pump in the calibrating process, the calibration constant will remain substantially accurate for variations in the speed of the pump caused either by a operator or by drifting of a speed control. For a peristaltic pump, this calibration will change somewhat because of the nonlinearity of the tubing with velocity change.

In still another aspect of the invention, the calibration constant is compared against a predetermined value which causes the control to enter into either a high flow mode or a low flow mode depending upon the outcome of the comparison. In the low flow mode volumes are resolved to a higher accuracy than in the high flow mode.

A further aspect of the invention is to provide for a batch dispenser which is capable of running in a calibrated mode to dispense a preset number of batches having accurate volumes in an automatic manner. The controller is provided with switch inputs which indicate the volume for each batch, the number of batches to be dispensed, and the time interval of a pause between each batch. The controller is adapted to read the input switches and, when placed in a batch mode, will automatically dispense the number of batches set in the switches while pausing between each batch for the interval selected and then come to a stop. This type of automatic batch dispensing is extremely advantageous in medical experiments or other precise chemical processes where large number of equal volume batches are needed for uniformity. Further, such apparatus would find advantageous use in filling commercial product containers with equivalent volumes of product.

The accuracy of the dispensing operation is enhanced by a dispensing method which meters out a batch until almost the entire quantity has been dispensed and then stops the pump. Thereafter, an intermittent operation of the pump brings the quantity dispensed to the desired volume. The intermittent operation of the pump divides the remaining small portion of the volume into many small increments which can then be dispensed without overflowing the intended end point of a batch. The stopping point of the pump is a function of the pump speed and is generally set farther before the end point the faster the pump is operated. Further, the control provides a different stopping point and size of dispensed increments based on whether the apparatus is in a low flow mode or a high flow mode.

Other objects, features, aspects and advantages of the present invention, together with the organization and manner of operation thereof will become apparent and more fully described in the following detailed description when taken in conjunction with the accompanying drawings where like reference numerals designate similar elements throughout the several views, and wherein:

BRIEF DESCRIPTION OF THE DRAWINGS

FIGS. 5 and 5a are detailed electrical schematics of the switch inputs illustrated in FIG. 1;

FIG. 6 is a detailed electrical schematic of the display illustrated in FIG. 1;

DETAILED DESCRIPTION OF THE PREFERRED EMBODIMENT

Figure 1:
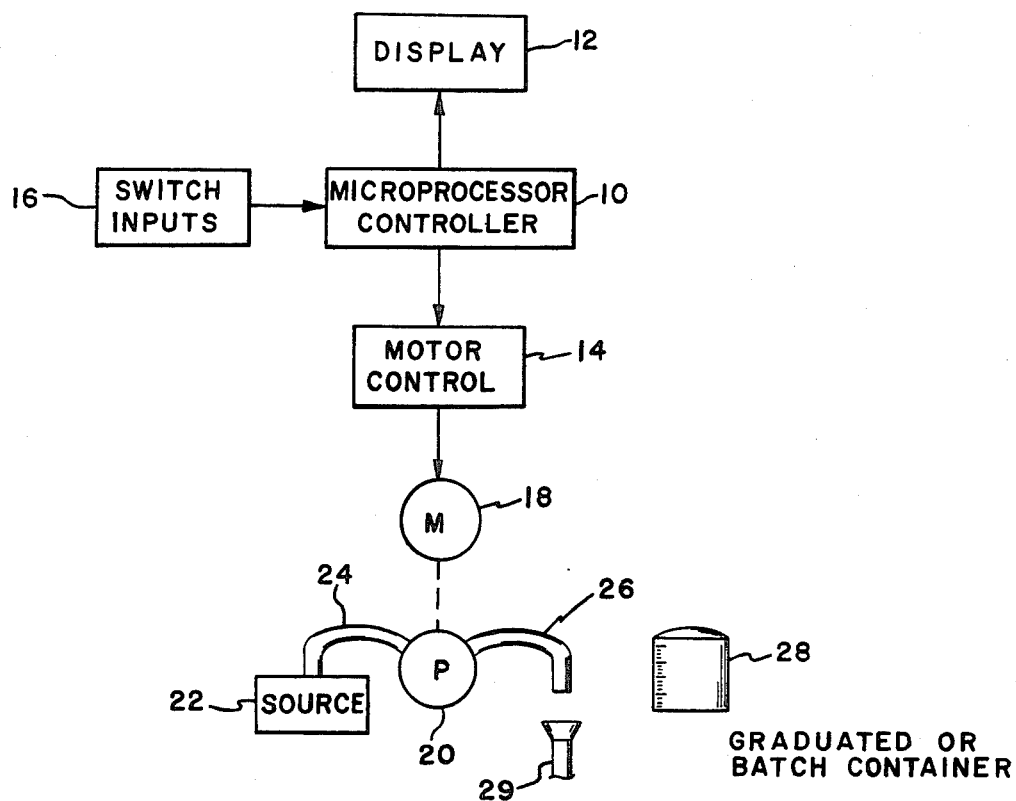
FIG. 1 is a system block diagram of a peristaltic pump and its associated pump controller which are constructed in accordance with this invention to operate as either an accurate flow meter or a dispenser.

In FIG. 1 there is illustrated a peristaltic pump control system constructed in accordance with the invention. A microprocessor controller 10 is used to switch a motor control 14 on or off so as to regulate the flow of a fluid through a peristaltic pump 20. The motor control 14 regulates the speed of motor 18 which rotates a positive displacement pumping means of the pump 20. The pump 20 is connected by a flexible conduit 24 to an input source of fluid 22. The pump 20 using the motion of the motor 18 pumps the fluid from the input conduit 24 to an output conduit 26 where it can be collected in a drain 29 or a container 28. The container 28 may either be graduated for use in a calibration operation, which will be more fully described hereinafter, or can be a product container which is to be filled of an exact volume with the source material. Alternatively, the output of the conduit 26 may be directed to dispense the fluid material from source 22 on any surface or product such as condiments for dispensing on food product.

The designation input conduit 24 and output conduit 26 are made for convenience only to illustrate a flow meter and dispenser operation. It should be noted that the peristaltic pump 20 is bidirectional and can be used to withdraw measured amounts of fluid from container 28 and transfer them to the source 22.

Generally, the motor control 14 is a closed loop speed controller which in response to a desired speed setting holds that speed setting accurately. The microprocessor controller 10 is used to turn the motor control on and off such that the pump 20 will dispense fluid on command. The microprocessor controller 10 receives a number of operator instructions from switch inputs 16 indicating the mode in which the apparatus is to run, which parameters are to be displayed on a display 12, and whether to operate or stop. In conjunction with the switch inputs bringing information from the operator to the controller 10, the microprocessor controller displays system parameters selected by the operator on the display 12. Basically, display 12 is a multidigit 7-segment display on which the flow rate of the system, the revolutions per minute of the motor, the cumulative volume dispensed, and the number of a batch being dispensed can be displayed.

Figure 2:
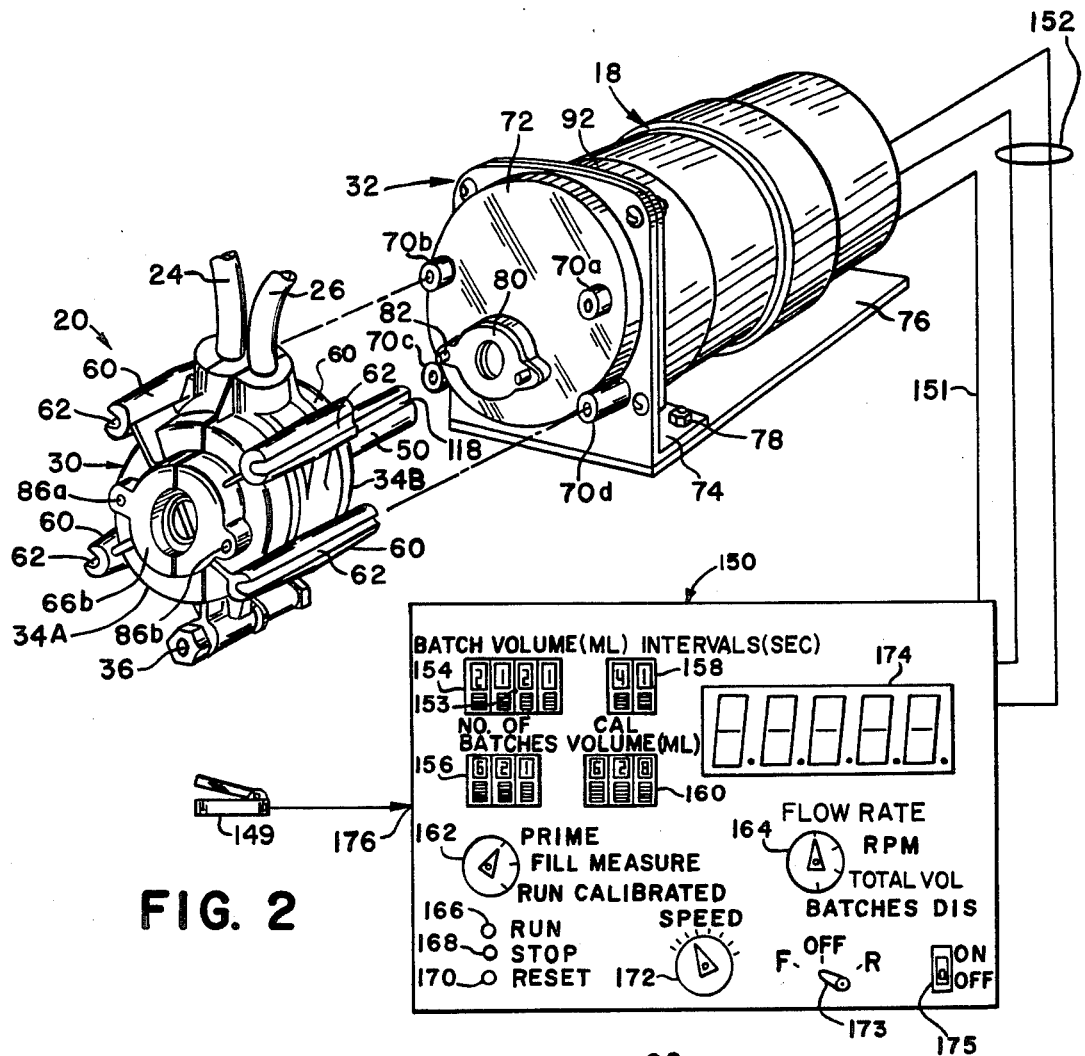
FIG. 2 is an exploded perspective view of a peristaltic pump and drive motor which are controlled by the pump controller illustrated in FIG. 1.
Figure 3:
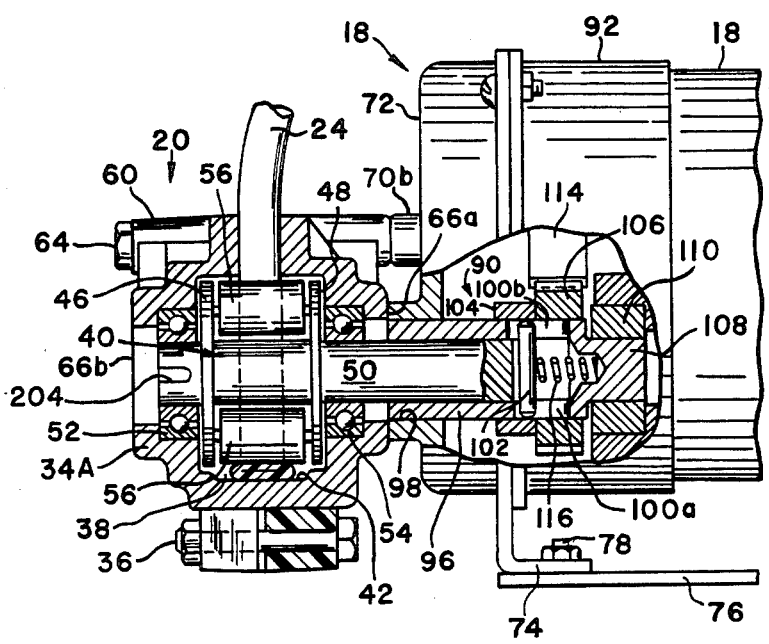
FIG. 3 is a fragmentary longitudinal sectional view of the peristaltic pump illustrated in FIG. 1 which is shown attached to the drive motor.

Referring now to FIGS. 2 and 3, there is illustrated a particular implementation of the block diagram illustrated in FIG. 1, where an electric motor 18 is adapted to drive a peristaltic pump 20. The peristaltic pump 20 includes a pump housing 30 which facilitates easy opening for manipulating and/or replacement of the flexible fluid conduit or tube 24 and 26. A mounting support means 32 is provided on the end of the electric motor 18 and in cooperation with the peristaltic pump 20 facilitates easy removal of the pump from the mounting support for servicing of the pump and the associated tube.

The pump housing 30 preferably is made of a suitable transparent plastic such as polycarbonate or acrylic resin and is formed in two identical halves or sections 34A and 34B hinged together through a connecting bolt 36. The housing sections 34A and 34B define mating surfaces which when closed seal an internal pumping chamber 38 adapted to receive and support rotary displacement means indicated generally at 40 in FIG. 3. The rotary displacement means 40 are operatively associated with the flexible tubular conduit 24 and are adapted to create a peristaltic pumping action within the tube in a known manner. The particular details of the rotary displacement means 40 and its operation relative to the fluid conduit or tube 24 to affect a peristaltic pumping action is described in detail in the referenced U.S. Pat. No. 3,358,609.

Figure 4A:
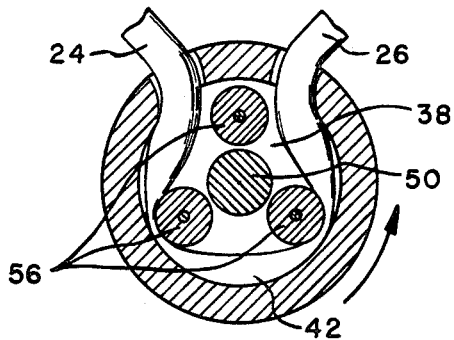
FIGS. 4A, 4B and 4C are fragmentary sectional views of the compressible fluid tube and positive displacement means illustrated in FIG. 2.
Figure 4B:
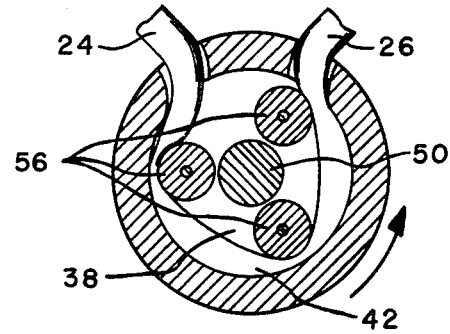
Figure 4C:
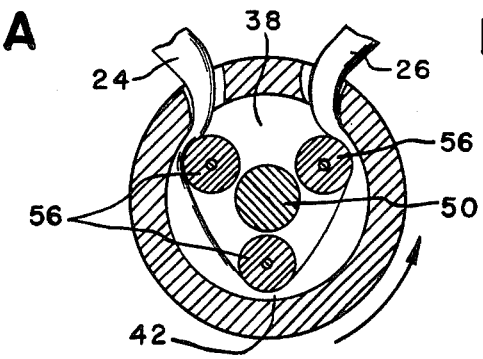

Briefly, as seen in FIGS. 4A-4C, the tube 24 is deformable and has a elastic memory so that the tube will return to its original shape after being deformed by a moving force applied to compress the tube wall. As is well known in the operation of peristaltic pumps, moving regions of compression as shown at the bottom of the pumping chamber 38 at 42, are intermittently created along the length of the tube 24 disposed within the pump housing 30 to push fluid within the tube forwardly from the compressed region. After compression the tube wall returns to its uncompressed condition and effects a partial vacuum which draws fluid forwardly from the region of the tube upstream of the previously compressed region.

In the illustrated embodiment, the tube 24 extends into the housing 30 through an opening in the housing section 34A and out of the housing 30 through a second opening in the housing section 34B as tube 26. The conduit 24,26 forms an internal loop within the pumping chamber 38 wherein the tube is received in a recess 42 circumferentially extending around the chamber 38. The axis of the openings in the housing 30 are generally radial to the curvature of the recess 42 so the tube is forced to deviate from its loop curvature as it enters and leaves the housing. During pumping a slight bulge is created in the conduit 24 at the inner edge of one of the openings which serve as entry and exit openings for the conduit. The bulge and the angular deviation of the tube 24,26 at the openings inhibits the tube from annular movement in the housing 30 as it is subjected to resultant forces caused by the moving regions of compression of its internal loop portion.

As seen in FIG. 3, the rotary displacement means 40 includes a pair of axially spaced annular disks 46 and 48 mounted in a parallel relationship on a cylindrical drive shaft 50. The drive shaft is rotatably supported through bearings 52 and 54 within the housing 30 and the bearings are coaxial with the longitudinal axis of the housing. The disks 46 and 48 rotatably support three cylindrical rollers 56 which are equidistantly spaced circumferentially around the drive shaft 50. The rollers 56 are adapted to successively engage the internal loop portion of the conduit 24 in response to rotation of the drive shaft 50 so as to compress the tube within the recess 42 and form the moving regions of compression which force the fluid within the tube forward of the regions.

The portion of the recess or groove 42 opposite the openings is shallower than the remaining portion of the recess so as to cause the tube to be fully compressed by successive rollers 56 as they transverse this shallow portion of the recess. This operation affects momentary multiple occlusions at that point during the rotation of the drive shaft 50. As the conduit 24 returns to its uncompressed condition after compression by each roller, a partial vacuum is created in the tube tending to draw the from downstream of the previously compressed region through the tube in the direction of movement of the rollers 56. This action is continued until the desired quantity of fluid has been passed through the conduit 24. Each region of compression positively displaces a known quantity of fluid and thus the flow rate and volume pumped through the pump is directly related to the speed and amount of angular rotation of the pump. It is further noted that this relationship is true whether the pump is rotated in forward or reverse direction.

The housing sections 34A, 34B can be opened in the lateral direction to provide access to the internal rotary displacement means 40 and associated conduit 24 for servicing and/or replacement of the conduit. The conduit receiving recess or groove 42 is made symetrical about the circumference of the pumping chamber to facilitate rotation of the displacement means 40 in either rotational direction for affecting a peristaltic pumping action. The reversible pumping feature enables a single type of pump to be utilized to both fill and empty a reservoir of fluid.

In the illustrated embodiment, the peristaltic pump 30 has two mounting sleeves 60 formed on each pump section 34A and 34B. Each mounting sleeve has a longitudinally extending slot 62 adapted to receive a mounting screw 64. The ends of the mounting screws 64 are adapted to engage internally threaded mounting bosses 70A-D formed on the moiunting bracket 72. The mounting bracket 72 has an outwardly extending boss 80 in which is symetrically affixed a pair of locating and retaining pins 82 adapted to be received within correspondingly located bores 86A, 86B formed in both end surfaces of the pump housing 30.

In mounting the pump 20 on the mounting bracket 72, the mounting sleeves 60 of housing 30 are aligned with the mounting bosses 70A-D on the support bracket 72 and the screws 64 are inserted in the slots 62 and threaded into the bosses. Simultaneously with the positioning of the sleeves 60 against the mounting bosses 70A-D, the locating and retaining pins 82 are received within the opposed mounting bores 86A,B of the housing 30 so as to define cooperating detent means adapted to maintain the housing section in a closed relation.

As the pump 20 is mounted on the mounting bracket 72 a drive shaft 50 which extends axially outwardly from the end of the housing 30 is inserted within a drive shaft assembly indicated generally at 90 in FIG. 3. The pump 20 therefore is supported by the support bracket 72 and mated to rearward housing 92 to secure it to the electric motor 18. The drive shaft assembly 90 facilitates a quick attachment with the drive shaft 50 and includes a guide sleeve 96 rotatably supported within a cylindrical bore 98 and the support bracket 72. The sleeve 96 has an internal bore of sufficient size to receive the drive shaft 50 therein and has a pair of diametrically opposed longitudinal slots 100A and 100B which receive the opposite ends of a transverse drive key 102. The drive key 102 is retained within the slots 100A and 100B by retainer sleeve 104 and an annular drive gear 106 secured on the peripheral surface of the sleeve 96 to overlie the slots 100A,B. The guide sleeve 96 has a reduced diameter rearward end 108 supported within an annular bushing 110 mounted within the housing end 92. The annular gear 106 is fixed on the sleeve 96 and is matingly cooperable with a drive gear 114 rotatably driven by the electric motor 18 so as to effect rotation of the sleeve 96 and associated drive key 102. A coil compression spring 116 acts against the drive key 102 to urge it toward the forward end of the slots 100A,B.

The outer end of the drive shaft 50 has a transverse drive slot 118 adapted to receive the drive key 102 therein when the pump 20 is mounted on the support bracket 72 with the drive shaft inserted into the sleeve 96. If the drive slot 118 is not properly aligned with the drive key 102 when the shaft 50 is inserted in the sleeve 96, the drive key will be moved forwardly by the action of the spring 116 to facilitate correct alignment. When the drive motor 18 is energized, initial rotation of the drive key 102 will align it with the drive slot 118 whereupon the spring 116 will urge the drive key into the drive slot to effect driving rotation of the pump shaft 50. The drive gear 114 may be connected directly to the electric motor armature shaft (not shown) or can be suitably connected through a gear head contained in the housing 92 to effect a gearing down of the rotational velocity of the electric motor 18. Preferably, normal gear ratios of 36:1 and 6:1 are available to gear the electric motor 18 down to 100 RPM and 600 RPM respectively, for rotation of the motor shaft 50.

A control cabinet 150 which contains circuitry for the microprocessor controller 10, display 12, motor control 14, and switch inputs 16, is illustrated as connected to the electric motor to provide driving power for the motor 18 through power cable 152. A feedback line 151 is further connected to an annular position sensor to transmit pulses representative of increments of movement of the motor 18. On the face of the cabinet 150 are provided the control switches and displays necessary for the operator to control the operation of the pump 20 and to read various parameters of the system. A plurality of thumbwheel switch sets 154, 156, 158 and 160 are provided to allow the operator to dial into the system a number of parameters which are read by the microprocessor controller 10.

Switch set 154 provides 4 digits of (binary coded decimal) BCD input for presetting a batch volume. This is the volume in milliliters that each batch should contain if the pump system is used as a dispenser. If the apparatus is in a low flow mode then LED 153 is lit to indicated a resolution to 0.01 milliliters. The switch set 156 provides 3 BCD digits for indicating the number of batches to be dispensed when the pump system is used in the dispenser mode. Switch set 158 provides 2 BCD digits describing the interval in seconds between batches when the pump system is used in a dispenser mode. Switch set 160 provides 3 BCD digits which indicate a calibration volume in milliliters which has been dispensed and is used in the calibration operation.

A mode control switch 162 is provided for producing three different operations corresponding to its three selectable positions. The first position is a prime mode where the pump may be started and run until fluid fills, and air is purged from, the flexible conduit 24. The second mode is a fill measure operation which outputs fluid while the apparatus records counts corresponding to the number of revolutions of the motor as sensed by the incremental angular position sensor. The fill measure mode is, as will more fully be explained hereinafter, used in the calibration operation for the pump system. The final mode, or the run calibrated position of switch 162, is used when the system is calibrated and, thereafter, can be used either as a flow meter or as a dispenser.

The system automatically recognizes whether it is to be used as a flow meter or a dispenser by reading the batch volume switches 154. If the setting for switch set 154 is zero, then the system knows automatically that it is to be in a flow meter mode. If the switch set is selected to some predetermined value then the operator desires a dispensing mode and the system automatically reads those values and produces the dispensing.

A push button run switch 166 is used to begin the operation of the prime, fill measure, and run calibrated modes. Likewise, a push button stop switch 168 is used to interrupt or stop the system operation in the prime, fill measure, and run calibrated modes. In addition, a variable potentiometer control 172 is provided for the operator so he may vary the output speed of the pump system. A power on-off switch 175 is used to control AC line power to the circuitry and motor 18 while a three position switch 173 allows the selection of the rotation directions of the motor 18 as either off (no rotation), F (forward), or R (reverse). Forward is defined as pumping from conduit part 24 to conduit part 26 while reverse is defined as a motor direction causing pumping from output to input.

A 5 digit seven-segment display 174 allows the operator to continuously monitor system parameters in the system while operation is taking place. The display is selectable to display four different parameters as chosen by a display mode indicator switch 164. The operator can in a first position display the flow rate of the apparatus in ml./min. or, in a second position, display the speed of the motor in RPM. In addition, the display switch 164 has a third position to display the total volume of fluid dispensed since a push button reset switch 170 has last been activated. The last position on the display switch 164 is to display the number of the batch being dispensed when the apparatus is used as a dispenser. The cabinet 150 also provides an input jack 176 into which a remotely controlled switch, such as foot switch 149, may be inserted for operating the pump system.

Figure 7:
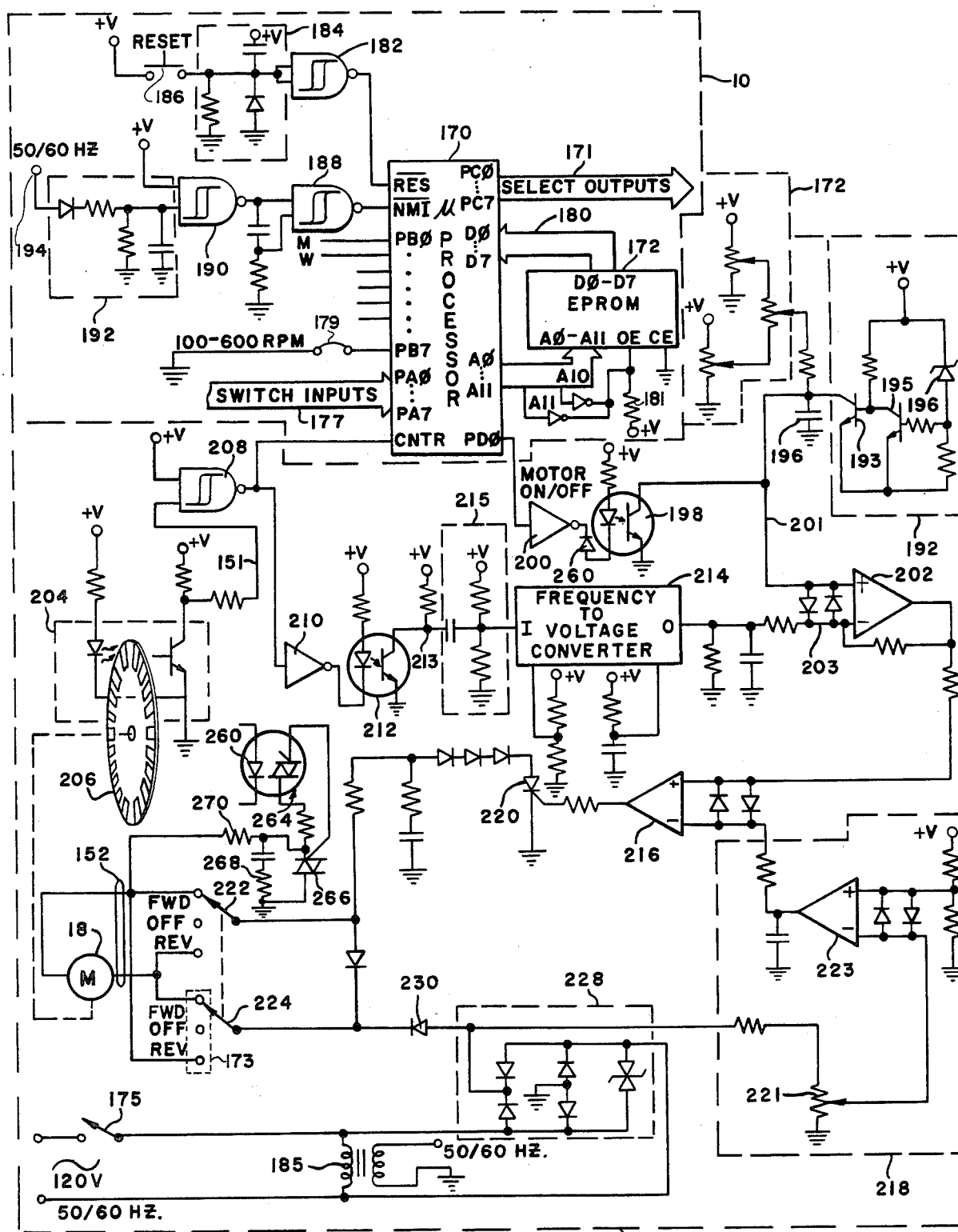
FIG. 7 is a detailed electrical schematic of the microprocessor controller and motor control illustrated in FIG. 1.

The microprocessor controller 10 is illustrated in FIG. 7 as including a microprocessor 170 having four bidirectional 8-bit ports PA, PB, PC, PD. Port A lines PA0–PA7 are used for input of 8-bit digital numbers from the switches 16 via a bus 177. The port B lines PB0–PB7 are used in one instance to generate two control signals M and W to the display 12 via port lines PB0 and PB1, respectively, and in another instance to read a jumper 179 where a ground or an open circuit on port line PB7 indicates whether the microprocessor controller 10 is connected to a system with a gearhead on the motor 18 which is geared to 100 RPM or 600 RPM, respectively. The port C lines PC0–PC7 are used to select which switch inputs are read by means of a bus 171 and provide alternative use as a data bus to the display means 12. Only one port line, PD0, of port D is used to provide a control output which indicates by its logic level whether the motor 18 should be on or off.

The microprocessor 170 is also connected through its address bus A0–A11 to similarly numbered address inputs of an EPROM 172. The data outputs D0–D7 of the EPROM 172 are connected through a data bus 180 to the data inputs D0–D7 of the microprocessor 170. Address line A11 is also connected to the output enable input OE of the EPROM 172 by means of a pull up resistor 181. The EPROM 172 contains the control program for the microprocessor 170 and is read in a fetch-execute cycle by addressing the EPROM via the address bus outputs A0–A11 and enabling the chip with address line A11. The data from the selected memory location is then read into the microprocessor through the data bus 180 and inputs D0–D7 for execution.

The microprocessor 170 under control of the program stored in the EPROM 172 reads the switch inputs 16 to determine the functions to be accomplished and turns the motor on and off via the control line PD0 in response to the command. Further, the system parameters generated and stored in the internal RAM of the microprocessor 170 are available for display via the control lines PB0, PB1 and the data output lines PC0–PC7.

In addition, the microprocessor 170 may be reset via a pulse to its *RES input. The pulse comes from a Schmidt trigger 182 which inverts a positive signal from a powerup circuit 184. The powerup circuit 184, when power is turned on initially, provides a high logic level to the Schmidt trigger 182 which inverts that level to produce a reset pulse. The circuit 184 then at the rate of its RC time constant reduces the input logic level to ground which removes the reset. Thus, the control program contained in the EPROM 172 begins at the same location every time the power is turned on. For a manual system reset, a push button 186 applies a high level signal to the gate 182 which is inverted to generate a reset pulse at the *RES input of the microprocessor 170.

A time base is maintained for the microprocessor through an interrupt routine which is executed periodically from interrupt pulses generated to its nonmaskable interrupt input *NMI. The interrupts are generated from an alternating current waveform developed from the line voltage by step down transformer 185. The alternating current waveform is applied to terminal 194 of peak detecting and half wave rectifier circuit 192. The peaks of the AC waveform are then shaped and inverted by trigger gates 190 and 188 to form interrupts at the frequency of the power supply. The power supply is adaptable for either 50/60 hertz and the time base is varied according to need. A time base such as the line frequency will allow the microprocessor to maintain an internal time interval register as will be more fully explained hereinafter. Although the line frequency is shown as the time base of the apparatus, it is evident that any stable clock frequency could be used.

The microprocessor controller 10 further receives pulses indicative of increments of angular rotation of the motor shaft via its counter interrupt input CNTR. The pulses are generated via an optical encoder which is attached to the armature shaft of the motor 18. The optical encoder includes an encoder disk 206 with alternating transparent and opaque areas which interrupt the light between a LED and a photo-transistor of an optical coupler 204. The pulses are shaped by a trigger gate 208 before they are applied to the CNTR input of the microprocessor 170. Each pulse is indicative of an increment of angular rotation of the motor shaft, and after the system is calibrated, the microprocessor 170 can directly determine the flow rate of fluid being pumped through the pump 20 accurately and precisely. In addition, the frequency of the pulses can be directly transformed into an RPM measurement of pump speed.

In FIG. 5 there is shown the circuitry used by the microprocessor 170 to read the switch inputs into the memory so that it can process the commands. Each of the switches of switch sets 154, 156, 158, and 160 are comprised of single digit thumbwheels D1–D12, each having a four-bit BCD output. Each output line of a switch is connected to one of the bus lines PA0–PA7 communicating with the port A input of microprocessor 170. Since each BCD digit requires four port lines, the digits are grouped in pairs of two such that a full 8 bits of information may be read into port A at a single time. Each pair of digits is activated by the low output from an inverter which receives a signal from one of the select digit lines PC0–PC7 of port C. A high logic level on one of the port C output lines, for example, PC0 is inverted by the inverter and causes each digit pair to output a binary number on lines PA0–PA7 which may be read into port A of the microprocessor. By selecting which output line of port C is activated, the microprocessor 170 may then receive information on the switch settings of all digits D1–D12.

Select line PC0 enables the reading of a digital word comprising digits, D10, D13. Select lines PC1 enables the reading of digits D11, D12. Port C, line PC2 enables the reading of digit D14, D15. Similarly, port C lines PC3, PC4, PC5, PC6 and PC7 respectively enable the reading of digit pairs D1–D2, D3–D4, D5, D6–D7, and D8–D9. Digit D13 is the mode switch 162 and provides a ground indication through diode 161 to port A when port C, line PC0 is activated. Similarly, the position of the display switch 164 embodied as D14 is recognized by a ground level on the port A lines that the separate switch contacts are connected to. The ground path is coupled through the selected switch contact, the switch lever, and diode 163. Similarly, for digit D15, the activation of one of the push button switches 166, 168, and 170 for indicating a reset of the volume counter, a run operation, or a stop operation is provided by activating the port C line, PC2, to provide a ground signal through the activated push button switch and diode 165.

FIG. 5A illustrates a more detailed electrical schematic of each digit of a thumbwheel switch. The port A lines PAx are connected separately to individual diodes poled for conduction toward switch contact 123. The switch contacts represent closure of combinations of a decimal number in BCD representation where an open switch contact is a zero level and a closed switch contact is a one level. The common contact for the four switch contacts is connected to the output of inverter 122 which has an enable line input from port C, PCx. When the port C line, PCx, is at a high logic level, the inverter output will sink current from the port A lines PAx through one of the diodes and a closed switch to indicate a logic level of one for that bit of the digit. An open switch will not conduct and provide an indication of a zero level for the particular bit of that digit. In this manner, the microprocessor 170 by strobing the inverters with the select lines PCx can read the BCD representation of the decimal number set in the switches.

FIG. 6 illustrates a detailed schematic of the 5-digit, seven-segment display 154 which comprises a display driver 110 and 5 seven-segment display chips 112, 114, 116, 118 and 120. The display driver 110 has its data outputs a–g and decimal point outputs dp commonly connected to similarly referenced inputs of the display chips 112–120. The data inputs ID0–ID7 of the display driver 110 are connected to the port lines PC0–PC7, while the control inputs for the mode M and the read/write function W are connected to the port B lines PB0, PB1, respectively. The control outputs D1–D5 are connected to the chip enable inputs CE of the display chips 112–120, respectively. The batch volume LED 153 for low flow mode is connected between the control output D8 and data output dp.

The microprocessor 170 by controlling the digital logic levels of the port C lines PC0–PC7 and the port B lines PB0 and PB1 can produce any number or letter in any of the display digits 112–120. The output word for enabling the desired digit of the display is placed on the port C data lines PC0–PC7 and the mode M selected by the output line PB0. Once the required display chip is enabled, data can be written to the specific chip by then placing data on lines PC0–PC7 and providing a high logic level to the write function input W via line PB1. This will cause the respective outputs as provided by outputs a–g, and dp to be energized for visual display. The display driver 110 decodes the binary representation of the number into the segment display representation automatically upon the correct mode and write levels.

Returning now to FIG. 7, the motor control 14 will be more fully described with reference to the detailed circuitry in that figure. The motor control is a closed loop speed control which is based on a desired speed reference voltage which is input over conductor 201 to the noninverting input of an operational amplifier 202. The desired speed signal is compared to an actual speed signal which is input over conductor 203 to the inverting input of the operational amplifier 202. The amplifier 202 acts as a differential error amplifier to produce an analog voltage level indicating the proportional error signal between the desired speed of the motor and the actual speed. This error signal is fed to the noninverting input of operational amplifier 216 configured as a differential comparator. The other signal to the inverting input of the differential comparator 216 is a triangular shaped waveform from a ramp generation circuit 218. The triangular shape of the waveform has a period approximately equal to the period of the A/C power line voltage supply. Depending upon whether the power supply is 50 or 60 Hz, the frequency of the triangular waveform will be different.

The triangular waveform is generated from the full wave rectified but unfiltered voltage from full wave rectifier 228. Depending upon the level of the reference voltage of divider 221, each half cycle of rectified DC intercepts a set level to generate a ramp by discharging a capacitor in a linear manner until the point in the DC waveform where the DC waveform is greater, than the reference value. At that point, the capacitor begins to charge relatively quickly until the next half cycle of the DC waveform.

Figure 8A:
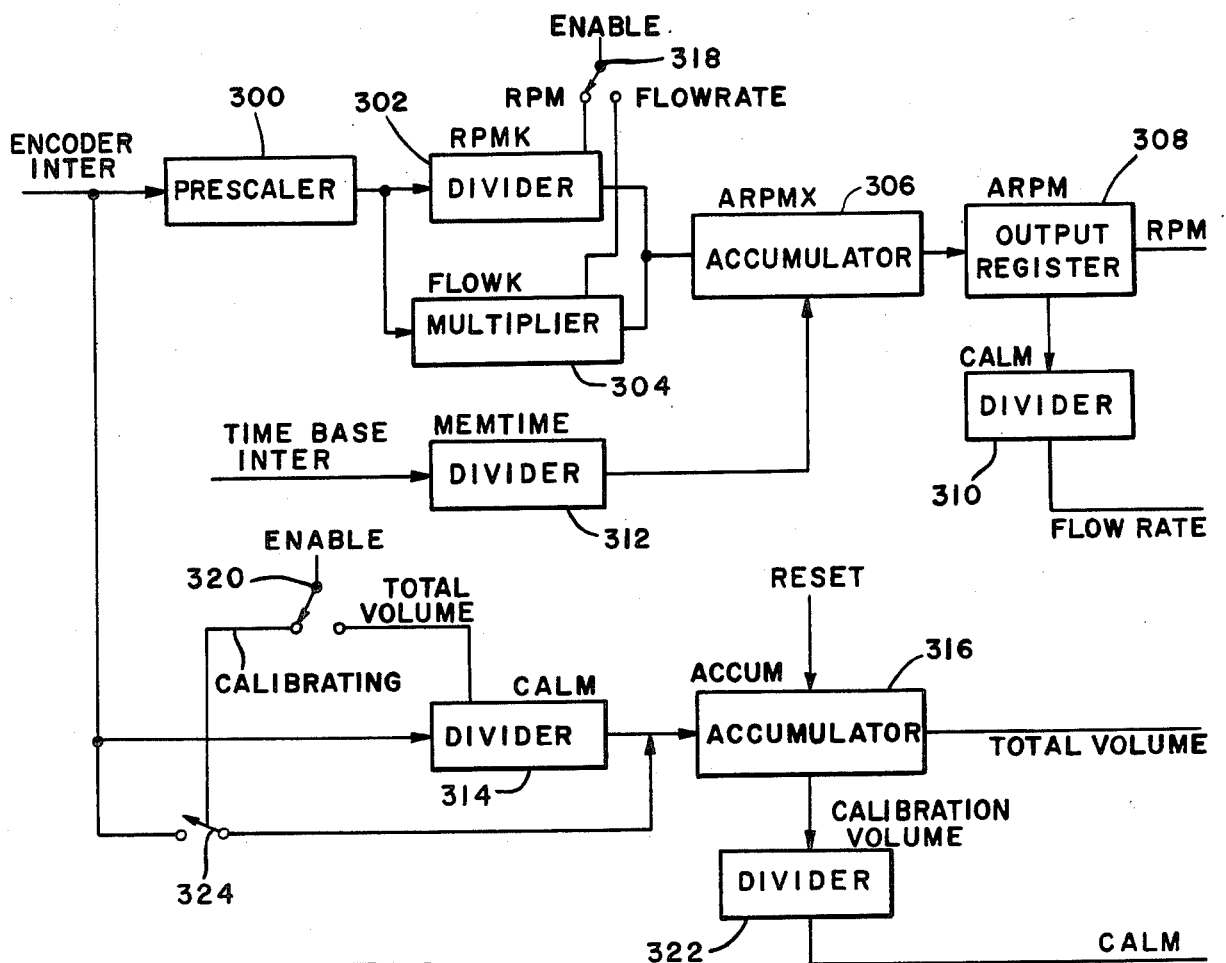
FIG. 8A is a functional block diagram of the operations performed for calculating a calibration constant, revolutions per minute of the pump head, the flow rate of the pump, and the total volume.
Figure 8B:
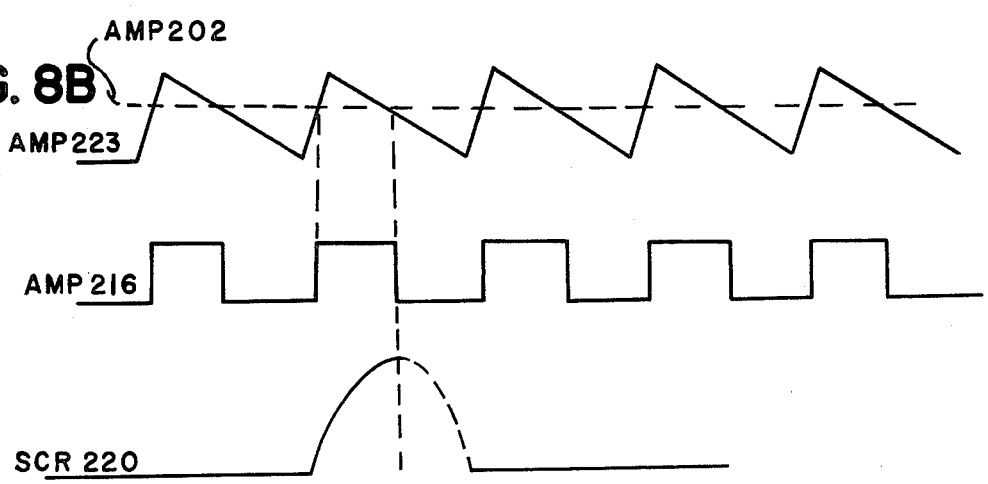
FIG. 8B is a waveform diagram of the electrical signals for controlling the pump motor as generated by the motor control illustrated in FIG. 7.

The ramps of the triangular waveforms are compared in the differential comparator 216 with the varying voltage level from the error amplifier 202 (FIG. 8B). Depending upon where the error voltage intersects the triangular waveform in the variable half cycles, a pulsating DC power signal will be applied to the trigger input of a SCR 220. This provides a variable speed control regulating the on time of the SCR 220 for each cycle, and this time can be varied by the voltage level of amplifier 202 depending upon whether the motor speed control needs to increase the speed of the motor or decrease it. Power for the motor is supplied through the diode 230 from the output of a full wave rectifier 228. The pulsating DC power is fed through switch contact 224 to either a forward, or a reverse contact of switch 173 and then to motor 18. The power is then conducted through switch contact 222 which is ganged with switch contact 224 to provide a directional flow for the current through the motor 18. The current, after passing through switch contact 222, completes the circuit through the anode to cathode path of the SCR 220 and thereafter to ground. The on/off switch 175 provides power from a typical 120 V, 50/60 Hz. source to the full wave rectifier 228.

The desired set point or speed reference is developed from the speed setting dial 172 which is embodied as a number of potentiometers where the adjustment slider is physically connected to the switch knob and can be turned to set a particular voltage on an noninverting input of the error amplifier 202. The microprocessor 170 through the port output line PD0 can ground this point by providing a high logic level which is inverted by inverter 200 to turn on the LED of an optoisolator device 198. The phototransistor of the optoisolator device 198 when the LED is energized, grounds the conductor 201 through the collecter-emmitter junction of the phototransistor thereby holding that point to essentially 0.6 V. This has the effect of providing a zero speed reference and turning the motor off. Therefore, the microprocessor 170 has control of turning the motor on and off through the error amplifier 202.

A dynamic brake is further provided for the motor 18 to prevent coasting errors when the pump is turned off. This brake, generally comprising a resistor 270, is connected to the motor 18 through TRIAC 266 when the motor is to be turned off. Any inductive energy stored in the motor 18 is thereby shunted to ground through the brake circuit. A snubbing circuit 268 prevents the TRIAC from turning on without an appropriate trigger signal and this type of bidirectional device is used because current flow in the motor 18 may be in either direction. The TRIAC 266 is triggered from a photo triac of optoisolator device 264 which is turned on in response to LED 260 being energized when the output of inverter 200 is low. This brake limits coasting in the pump between 0.3-0.5 of a revolution and permits anticipating a predetermined amount of coasting for each shut down.

The reference voltage on the error amplifier 202 is applied to a capacitor 196 which allows a soft start at the point where the motor is turned on. Although the phototransistor of the optoisolator 198 discharges the capacitor 196 very quickly, the capacitor charges more slowly at the time constant of its capacitance and the resistance of the connected voltage dividers of the speed setting switch 172. Therefore, after turning the motor 18 off, the speed reference voltage does not come on fully to the error amplifier 202 until the voltage on the capacitor 196 has had time to ramp up to that desired level. This soft start feature prevents the motor 18 from being possibly slammed from a stop to full speed.

Further, capacitor 196 is not charged fully to the desired reference level until the power supply for the logic comes up to its full voltage. A startup circuit 192 grounds the capacitor 196 through the collector to emitter junction of transistor 193 until it is turned off by a transistor 195. The transistor 195 is turned on in response to its base voltage attaining a set value as provided by Zener diode 196. That value will not be attained until the power supply voltage +v reaches its designated value. This protects the motor 18 in case of power failures and turns on so that the controller 14 will not try to start the motor during low voltage conditions.

The actual motor velocity signal is developed by a frequency to voltage converter 214 which accepts pulses from the encoder circuit 204 at the rate of the passage of the slots of the encoder disk 206. The pulses, as previously described, are passed through a Schmidt trigger 208 and, in one path, go to the microprocessor 170 for system calculation. In another path the pulses from the output of the Schmidt trigger 208 are applied to an inverter 210 which activates an optoisolator device 212. The presence of a pulse will be inverted and turn on the LED of the optoisolator 212 which activates the phototransistor to pull the node 213 to ground. This will produce an input pulse through a differentiation circuit 215 at the input I of the frequency to voltage converter 214. Thus, the converter 214 will output a DC voltage which is representative of the frequency of the pulses from the encoder wheel 206, representative of the actual speed of the motor 18.

The basic modes of operation of the apparatus will now be discussed. The most basic operational mode of the apparatus is as an uncalibrated flow controller. The operator moves the mode switch to the prime position and pushes the run button to pump fluid. The direction of pumping is determined by the positioning of the direction switch for either forward or reverse operation. The display will provide an accurate measure of RPM of the pump head as the time base reference of that apparatus does not depend on whether the apparatus is calibrated. The speed adjustment knob 172 may be used to vary the pump head speed over the range available. To stop the flow the operator depresses the stop button. It is normal to use the prime mode to rid the flow conduit of air before calibrating.

To enter the calibration operation, after priming, the operator switches the mode control switch to fill measure and then again depresses the run switch. When a measurable quantity of fluid has been pumped the apparatus is stopped and the volume of that quantity, either by volumetric or gravimetric measurement techniques, in milliliters is determined. That volume is then entered onto the calibration volume switches. During the fill measure mode the microprocessor 170 calculates the total angular rotation of the pump head by counting the encoder pulses occurring during that interval. When the actual measured volume is entered and the run switch is depressed, the microprocessor 170 computes a calibration constant, which allows it to calculate flow rate and cumulative volume.

The next general mode is use of the apparatus as a dispenser and is entered by setting a non zero number into the batch volume switches. The apparatus automatically defaults to this operation when it senses this condition and has been calibrated. In this mode, the operator dials in the desired volume in ml. for each batch, the number of batches between 1-99, and the time interval between batches in seconds. In a low flow mode the batch volume may be set to within 10 microliters. The operator then depresses the run switch to start an automatic sequence of batches. A change in any of the settings will be recognized at the completion of the batch in progress. If the number of batches dispensed switch setting is changed to less than or equal the number of batches already dispensed, the unit will stop dispensing.

During operation in this mode, the display readouts for flow rate and RPM have no particular meaning and are not used for monitoring purposes. During a batch sequence, the batches dispensed display will display the batch number in progress and once completed will display "donE". The cumulative reset switch may be used prior to a batching sequence, but it is not advisable to do so during a batching process, since the resultant information could be misleading. The stop switch may be activated during a batch operation and the operation restarted by activating the run switch to resume the interrupted cycle. Once a batch is in process, it may be properly terminated by: (a) allowing the cycle to finish or (b) resetting the number of batches switch to a number less than the current batch number.

Additionally, a batch cycle may be stopped by activating the master reset switch or by turning the power off and then on (which would require a recalibration of the system). During the batching operation, the microprocessor calculates and anticipates the end point of the volume to be dispensed. The pump motor automatically stops prior to the calculated end point and is then automatically turned on and off in intermittent bursts and the dynamic electrical brake activated as required until the exact value is reached. This provides small increments of fluid and divides the remaining volume to be dispensed into small volumes to ensure accuracy.

As previously noted, for very low flow rates, the preset batch volume is automatically calibrated in 0.01 of a milliliter, which limits the maximum size of a single dose to 99.99 ml. The intermittent operation is also maintained for low flow calibration and may add a slight additional time to the dispensing time, but with much improved precision (to $+/-10$ microliters).

A block diagram of the method of calculating revolutions per minute, flow rate, and total volume is more particularly detailed in FIG. 8A. In general, the revolutions per minute measurement is determined directly from the encoder interrupts and the time base interrupts by a direct counter or register method which produce a facile updating of the actual speed of the pumphead many of times per minute. The measurement of flow rate is determined in much the same manner where the encoder interrupts are counted and then multiplied to yield a output which is then scaled by a calibration constant. The calibration constant is additionally calculated by dividing a set number of encoder interrupts by a known calibration volume to equal a number of encoder interrupts per volume constant. The total volume measurement is a division of the encoder interrupts by the calibration constant which produces a measurement of a set volume. The occurrences of this predetermined volume are then accumulated over time to yield the total volume number.

The calculation for the revolutions per minute will now be described by noting the functional blocks labeled 300, 302, 306, 308, and 312. The encoder interrupts are passed through a prescaler 300 which divides the number of interrupts by a particular value according to what the gear ratio of the pump head happens to be. In the illustrated embodiment, a prescaler of 4 is used for a pump head gear ratio of 6:1 and a prescaler of 16 is used for a pump head gear ratio of 36:1. The prescalers are used so that counters of a limited length can be used for accummulating the pulses. The pulses are then divided by a divider 302 which is preset for division by a constant RPMK. After the pulses have been divided by the prescaler 300 and the divider 302 they are accumulated in an accumulator 306. The accumulator is a counter register in the software whose label is ARPMX.

During the time the accumulator 306 is accumulating the encoder interrupts, the time base interrupts are being applied to a divider 312. The divider 312 is preset for division by a constant labelled MEMTIME. Every period a constant number of time base interrupts occur, the accumulated total of the encoder interrupts in the accumulator 306 is transferred to an output register 308. The output register in the software is labelled ARPM. This number is the direct binary equivalent in units of revolutions per minute of the speed of the pump head. The binary number in the output register may thereafter be converted to BCD for display 12 in the display. The switch 318 is in a position which indicates that the mode display switch is to display RPM, which disables the flow rate calculation of the apparatus and enables the RPM calculation.

It should be noted that the number in the output register ARPM is as given in Equation 2 below, is n times a ratio K1 where n is the number of times that the numerator of equation 1 has been accumulated during an interval which is MEMTIME counts long. Therefore, it is seen that if K1 can be put into units of encoder counts per revolution per minute then the resulting number nk1, which is output to the register 308, will directly calculate revolutions per minute.

$$(RPMK \times PRESCALER)/MEMTIME = K1 \qquad (1)$$

where K1 = 1 rev./min.

$$ARPM = nK1 = RPM \tag{2}$$

Equation 3 below is an example of how the ratio K1 is calculated to determine the constants MEMTIME and RPMK used for the dividers 302 and 312. For a gear ratio of 6:1 and an encoder wheel having 128 encoder slots per revolution the numerator of Equation 3 yields the number of encoder interrupts in one revolution. For a 60 cps time base, the denominator of Equation 3 yields the number of time base interrupts in one minute. It is noted that this ratio may be then used to determine the dividers directly or as in Equation 4 reduced to the smallest fraction or lowest common denominator (LCD). It is to advantage to reduce the ratio to the LCD which provides an integer count for the numerator and denominator as this will provide a real time update the greatest amount of times per minute. However, it should be noted that any convenient ratio proportional to Equation 3 can be used.

$$\frac{\text{6 motor rev./pump rev.} \times \text{128 encoder inter./motor rev.}}{\text{60 cycles/sec.} \times \text{60 sec./min.}} = \tag{3}$$

$$\frac{6 \times 128}{60 \times 60} = \frac{1 \text{ rev.}}{1 \text{ min.}} = \frac{16}{75} \tag{4}$$

where RPMK = 16/4 = 4; MEMTIME = 75

Therefore, in the preferred embodiment the constant RPMK equals 4 prescaled interrupts after division by the prescaler and the time base interrupt divider MEMTIME equals 75 cycles.

If the switch 318 which represents the display mode indicator switch is moved to the flow rate position, then the RPM calculation is disabled and the flow rate calculation is enabled. Instead of the output of the prescaler 300 going to the divider 302 it then alternatively is input into a multiplier 304. The multiplier 304 multiples the output of the prescalers by flow rate constant FLOWK. The multiplied count is accumulated in the accumulator 306 and transferred to the output register 308 upon the occurrence of a MEMTIME pulse from divider 312. Therefore, the flow rate calculation uses the same time base from divider 312 as the RPM calculation which reduces the number of registers and time necessary to perform either of the calculations. Particularly, it is noted that the flow rate timing interval, as is the RPM interval, is a fraction of a minute and thus the flow rate calculation can be accurately updated many times per minute.

To illustrate how the flow rate is calculated, reference is directed to Equations 5–9 below where the derivation of the constant FLOWK is explained. Equation 6 indicates the number in the output register 308 which is labeled ARPM is n times a constant K2 divided by the time base constant MEMTIME where n is the number of encoder interrupts. From Equation 5 and inspection of the circuitry it is evident that K2 is the product of the flow constant FLOWK and the prescaler. Therefore if the constant K2 can be put in units of timing intervals (MEMTIME) per minute, then the result in the register ARPM will be directly readable in units of encoder interrupts per minute. With this in mind, Equation 7 illustrates the division of the result output to register 308 by the calibration constant CALM. Since the calibration constant is in units of encoder pulses per milliliter the division results in a flow rate in milliliters per minute (ml./min.).

$$\text{FLOW}K \times \text{PRESCALER} = K2 \tag{5}$$

where $$K2 = \frac{\text{MEMTIME}}{\text{min.}}$$

$$\text{ARPM} = \frac{n \times K2}{\text{MEMTIME}} = \frac{\text{encoder inter}}{\text{min.}} \tag{6}$$

$$\text{FLOWRATE} = \frac{(n \times K2)}{\text{MEMTIME}} / \text{CALM} = \text{ml./min.} \tag{7}$$

An example of a calculation for determining FLOWK is shown in Equations 8 and 9. If the same time base constant that was developed for RPM is used, in the previous example MEMTIME equals 75 cycles, then Equation 8 illustrates that K2 equals 48. The flow constant FLOWK then is the constant K2 divided by the prescaler which in the example above was 4. The flow constant FLOWK in this example is then 12 as shown in Equation 9.

$$\text{If MEMTIME} = 75 \text{ the} \tag{8}$$

$$K2 = \frac{60 \text{ sec/min.} \times 60 \text{ cycles/sec.}}{75 \text{ cycles/MEMTIME}} = 48$$

$$\text{FLOW}K = 48/4 = 12 \tag{9}$$

The functional blocks for calculating the total volume and the calibration constant CALM will now be more fully explained with reference to the lower half of FIG. 8A. The total volume is the number of pulses accumulated in an accumulator 316 between resets. The accumulator register 316 is labeled ACCUM in the software and receives an input from the encoder interrupts after being divided in a divider 314. The divider 314 has a preset divider constant which is the calibration constant CALM. In Equation 10 below, the numerical equivalency of this circuitry indicates that the number accumulated in ACCUM is n divided by the calibration constant CALM where n is the number of encoder interrupts. If the calibration constant CALM is in units of encoder interrupts per unit volume, in the illustrated example milliliters, then the output of ACCUM will be in milliliters. A switch 320 enables the divider 314 when it is in the total volume position and is indicative of the mode switch not being in the calibrating position.

$$\text{ACCUM} = \frac{n}{\text{CALM}} = \text{ml.} \tag{10}$$

Where $\text{CALM} = \frac{\text{encoder inter}}{\text{ml.}}$

If the mode switch is in the calibrating position then switch 320, which is representative thereof, enables a switch 324 which allows the encoder interrupts to bypass the divider 314. As many encoder interrupts as the accumulator 316 will hold can be accumulated during a calibration operation. During the accumulation of the encoder interrupts in the accumulator 316, the operator is collecting a calibration volume which is input and stored for use in the development of the calibration constant CALM. After the accumulation is halted, the calibration volume collected during that accumulation is used as a divisor in divider 322 which has its dividend input from accumulator 316. The result is the calibration constant CALM which because the calibration volume is in milliliters, calculates the calibration constant CALM in units of encoder interrupts per milliliter.

Figure 9:
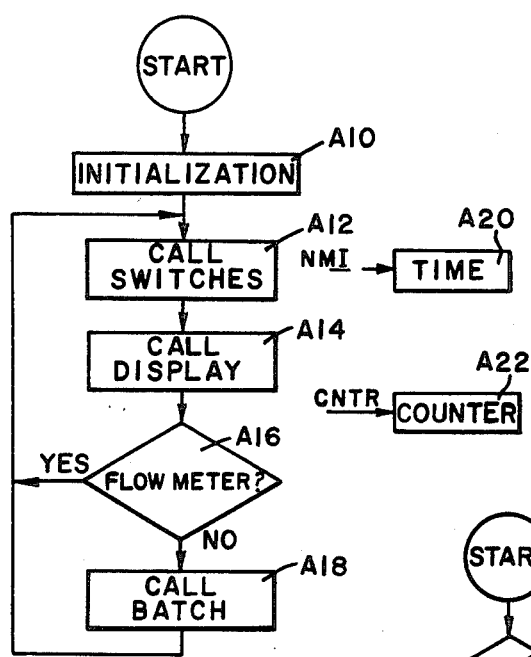
FIG. 9 is a system flow chart of the program stored in the microprocessor controller illustrated in FIG. 1.

In FIG. 9 there is shown a system flow chart of the system operational software loaded into EPROM 172 for the microprocessor 170. The system routine begins in Block A10 with an initialization block which enables the I/O ports PA, PB, PC and PD. Further the counter variables of the microprocessor 170 are set and the index and control registers are initialized. Next in this routine, RAM memory is assigned for particular variables to store the parameters used by the remaining portions of the routines and the BCD digits from the switches are given numerical assignments. Further, a routine is entered in the initialization block A10 to determine whether the time base for the nonmaskable interrupt is 50/60 Hz. This routine basically takes the time between two interrupts of the nonmaskable type and compares that interval with a constant. Depending upon the result of that comparison, the program will then store a number indicative of the time base in a particular location in memory. Particularly, the routine stores a zero in the location labeled MEMTIME if the time base is 50 Hz. and a hexidecimal 40 if the time base is 60 Hz.

Next during the initialization routine, a series of logic tests are performed on the time base constant and the jumper switch input PB7 from Port B which provides information on the pump head gear ratio. Depending upon whether the time base is 50 or 60 Hz. and the pump head gear ratio is 36:1 or 6:1, the program will select three constants from a table having a group of entries for each of the four possible conditions. These constants are then stored in the memory locations labeled MEMTIME, RPMK, and FLOWK.

The constant stored in MEMTIME is the time base constant for the power line cycle time of the apparatus while the RPMK constant is for encoder division to determine revolutions per minute for the pump. The flow rate constant stored in the memory location FLOWK is used for determining the flow rate in ml./min.

Thereafter, the prescalers for the encoder pulse counter are entered into the counter registers. The prescalers are either 4 or 16 and divide the incoming encoder pulses down by that a divisor depending upon whether the pump head is 36:1 or 6:1 gear ratio respectively. During most of the initialization routine the maskable interrupts have been disabled but when the program is ready to begin the main loop, the last operation of the initialization routine before entering is to enable those interrupts.

The main loop of the program begins in Block A12 where the subroutine SWITCHES is called to determine the position of the mode switch and display switch, to input numerical information from the thumbwheels, and to read commands from the push button switches. Based upon the mode and calibration information, the SWITCHES routine will perform various logic operations and jumps to different subroutines to provide the operation commanded.

Thereafter, a subroutine DISPLAY represented by Block A14 will be called to determine the information which is to be displayed in the five digit display on the face of the panel 150. After the display has been set, the program continues to Block A16 where it determines whether the device is being used as a flow meter or a dispenser. If the operational mode is a flow meter then the program loops back to Block A12 where the switches and display routines are again called. However, if the mode of operation of the device is a dispenser then the program transfers control to Block A18 where a subroutine BATCH is called. The BATCH subroutine reads the batch volume switches, the number of batches switches, and the time interval switches to determine the parameters to be used in the dispensing mode. After the input parameters have been determined, the routine automatically dispenses the precise amount of volume set in the batch volume switches for the number of times requested. It further provides a delay between the dispensing of each batch which is equivalent in seconds to the number set in the interval switches. After the BATCH routine has finished its operations, the main loop is reentered by a transfer of control back to Block A12. The main loop continues until the apparatus is powered down or reset.

Two interrupt routines labelled TIME and COUNTER in blocks A20 and A22 respectively complete the system flow diagram for the software of the apparatus. The TIME interrupt routine is entered at the occurrence of the nonmaskable interrupt NMI while the counter subroutine is entered upon the occurrence of an interrupt request CNTR. The priority of the flow for the operation of the program is that the TIME interrupt routine will have first priority over the main loop of the program and over the counter interrupt routine. The counter interrupt routine will then have priority over the main loop of the program except that during the initialization routine in block A10 when the maskable interrupts are disabled. The TIME interrupt routine develops a time base count from the power line cycles while the counter interrupt routine records the number of pulses from the encoder.

Figure 10:
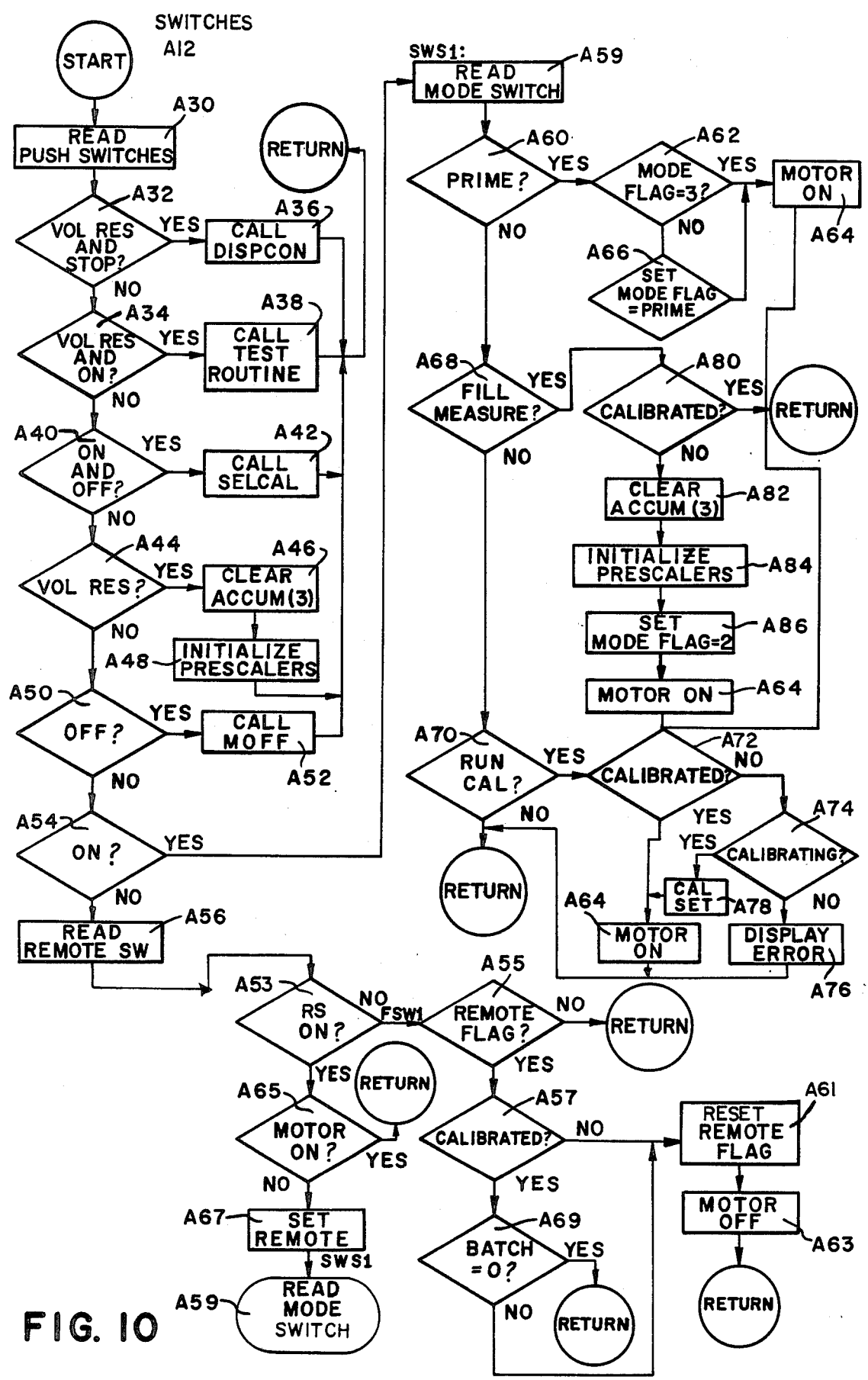
FIG. 10 is a detailed flow chart of the routine SWITCHES which is used to read the switch inputs for mode control and is called by the system program illustrated in FIG. 9.

The SWITCHES subroutine will now be more fully described with respect to FIG. 10 where it begins at Block A30. The first operation of the routine is to read the pushbutton switches for the command of stop, on, and volume reset as indicated at Block A30. Once these values have been read into the microprocessor 170 by strobing the appropriate port lines, a series of tests are accomplished to determine if any of the switches are operated either individually or in combination. In Block A32 a test is accomplished for the combination of the volume reset switch and the stop switch where a coincidence of operation of these switches will cause the routine to call a subroutine DISPCON at Block A36. The DISPCON routine will display the calibration constant CALM which was calculated during the calibration operation of the apparatus. This calibration constant may then be either written down or remembered so that it can be reentered if the system is reset or loses calibration for some other reasons such as a power down. In this manner, the apparatus does not have to be calibrated every time that it is turned off and on which causes the calibration constant to be lost from the RAM memory.

The next test in Block A34 detects the coincidence of operation for the volume reset switch and the on switch. If this combination is detected a diagnostic routine TEST is called in Block A38. The diagnostic routine tests the operation of the hardware and displays a series of error messages if the switches, input or output ports are nonoperable. The test routine has not been shown since it does not form part of the present invention. Next in Block A40, a test is performed to determine if there is a coincidence in the operation of the on and off switches. This combination is used to transfer control to Block A42 where a subroutine SELCAL is called. The SELCAL subroutine permits the calibration constant which was either remembered from the display or written down from another use of the device to be reentered into memory. Once the calibration constant is loaded, the apparatus may be run in its calibrated mode and used as though a calibration procedure had been performed.

In the next three blocks, A44, A50 and A54, respectively the individual switches are tested. Operation of the volume reset switch, as indicated by an affirmative branch from Block A44, will cause the program to clear the total accumulated volume counter ACCUM. The variation ACCUM is three bytes long and depending upon the flow mode, either high or low, can accumulate 0-999 ml. or 0-99.99 ml. After the total accumulated volume counter has been cleared in Block A48 the prescalers of the counters are initialized. The program then returns to another operation of the main loop.

If the off switch has been operated, as detected in Block A50, then control of the program will be transferred to Block A52 where the motor will be shut off. The motor is deenergized by clearing the bit on port D line PD0 of the microprocessor 170 which is connected to the optoisolator 198 controlling the speed reference leg of the speed controller (FIG. 7). In a manner similar to those routines previously called, the program will then return to another operation of the main loop.

If the on switch has been pressed, the apparatus recognizes that operation of the apparatus should have started and therefore begins a determination of which mode the operator desires the apparatus to be in. Thus, an affirmative response to the test in Block A54 will transfer control to Block A55 where the mode switch is read. In Block A60, A68 and A70, the different choices for the mode switch are tested. If the mode switch is not set to one of these positions, then the program automatically returns to the main loop.

In Block A60 if the prime mode is selected then a program branch is made to Block A62 wherein the memory location labeled MODEFLAG is tested to determine whether it is equal to 3. If this memory location contains this value, it is an indication that the apparatus is calibrated and should retain the calibration. Therefore, an affirmative response to this test transfers control to Block A64 where the motor is turned on to pump fluid until the off push button is operated. If MODEFLAG does not indicate that the apparatus is operating in a calibrated mode, then the program continues at Block A66 where the mode flag is set equal to one which is representative of a prime mode. Thereafter, the program sequences to Block A64 where the motor again is turned on. The prime mode of operation is used to allow the flexible tubing to be purged of air bubbles and other extraneous matter before a calibrated flow or batch dispensing is requested.

If the mode switch is not in the prime position and is alternatively in the fill measure position, as tested for by Block A68, then the program will branch to Block A80 where a test is performed to determine if the apparatus is calibrated. This determination is made by interrogating the memory location labeled MODEFLAG to determine if its value is 3. If the system is calibrated then the program automatically returns to the main loop. However, if the system has not yet been calibrated then in Blocks A82 and A84 the total accumulated volume counter ACCUM is cleared and the prescalers for the counters are set, respectively. Thereafter, this part of the routine sets the MODEFLAG indication equal to 2. After the mode flag has been set to a value representing a calibrating mode then the program continues to Block A64 by turning the motor on.

When the mode switch is in the run calibrate position, as sensed by the test in Block A70, then control is transferred to Block A72 where the mode flag is interrogated to determine if the system is calibrated. If the system is calibrated then the program transfers control to the Block A64 where the motor is turned on. If the system is not calibrated, and the mode switch is selecting a run calibrated mode, the next test in Block A74 determines whether the mode flag indicates that the apparatus is in a fill measure mode. If the system is being calibrated then the mode switch can be left in a run calibrated position and the program will transfer control to Block A78 where the calibration routine begins. However, if the operator has requested a run calibrated mode and the mode flag indicates that the system is neither calibrated or being calibrated then an error display will be output to the operator by Block A76. After the error has been displayed the program will return to the next task in the main loop.

Returning now to block A54, if the on switch is not true then the remote switch is read in block A56 to determine whether or not it is on. If the switch is not on, as determined by a negative branch from block A53, then in block A55 the remote flag is tested to determine whether the switch has previously been set and the motor should be on. If the remote flag is not set then the program immediately returns to the main loop. If the remote flag is set and the apparatus is calibrated, as determined by the affirmative branches through blocks A55 and A57, then in block A69 the program tests the batch number switches to determine if they are zero. If the batch number is zero and the system is calibrated, then the apparatus is to be run in a calibrated flow meter mode and the program simply returns. If the batch number is not zero meaning that the operation of the apparatus as a dispenser is desired, then the apparatus cannot run under the remote flag. Therefore, a negative branch from block A59 will transfer control to block A61 where the remote flag is reset. In a similar manner, if the system is not calibrated, the device cannot operate as a flow meter under the remote flag and the negative branch of the test in block A57 will also transfer control to block A61. After the remote flag has been reset, the motor is turned off in block A63 before the subroutine returns to the main loop.

Figure 11:
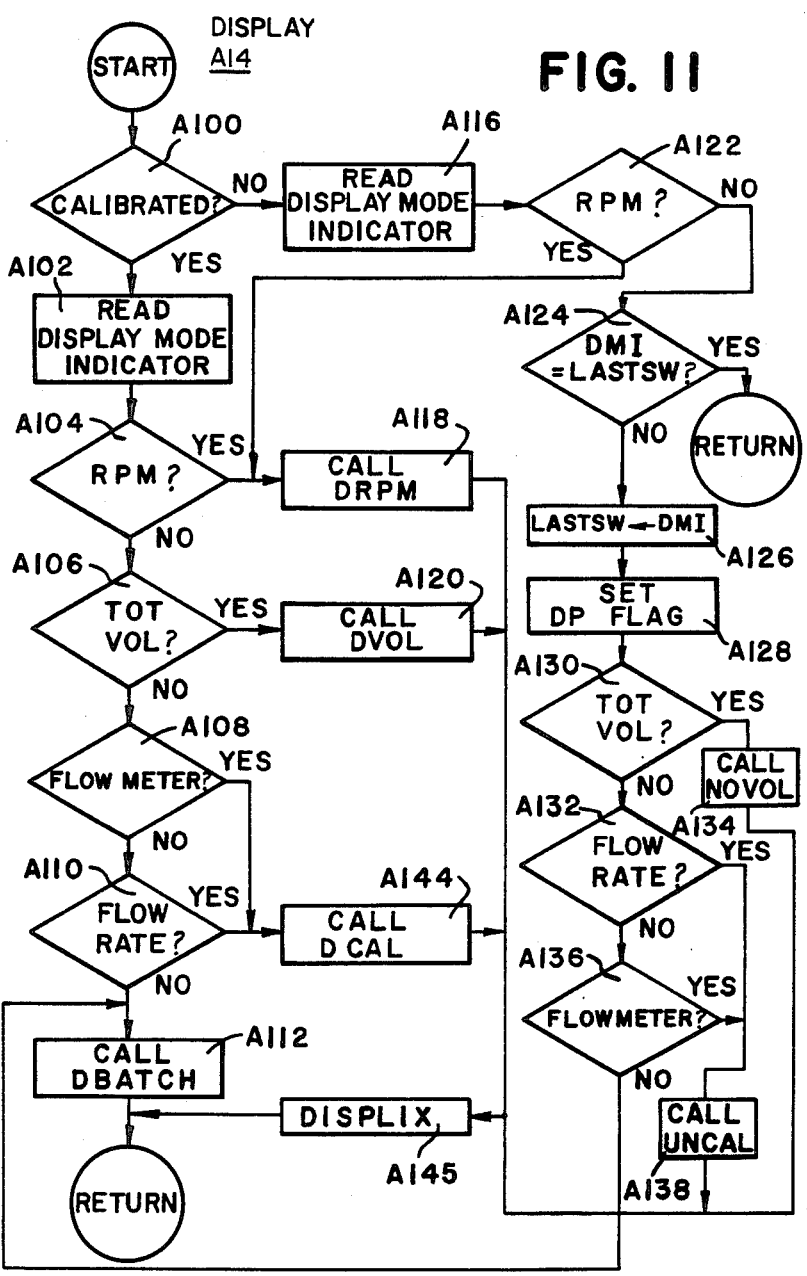
FIG. 11 is a detailed flow chart of the routine DISPLAY which is used to run the display and is called by the system program illustrated in FIG. 9.

If attention will now be directed to FIG. 11 a more detailed flow chart of the DISPLAY subroutine will be described. The display subroutine generally reads the mode flag and the display mode indicator switch to determine the parameters which will be output to the 5 digit display. Basically there are two modes in which the display routine operates, one of which is when the system is calibrated and the other when the system is not calibrated. The uncalibrated operation is different because the parameters for flow rate, total volume, and number of batches do not have meaning when the system is not precisely dispensing fluid. Therefore, special displays are provided for these uncalibrated conditions so that the operator will readily recognize them and not be mislead into thinking that the system is calibrated.

This routine begins in Block A100 where the mode flag is tested to determine if the apparatus has been calibrated. If the answer to this question is affirmative, then the mode indicator switch 164 is read by the routine as represented by Block A102. Next, a series of tests in Blocks A104–A110 determine the position of the mode indicator switch 164 and which parameter is to be displayed for the operator. If the switch position is set for displaying the revolutions per minute of the pump head, then an affirmative result from the test in Block A104 will transfer control to Block A118 where the routine DRPM is called. The routine DRPM loads the contents of the memory location labeled ARPM into a register before transferring control to a display routine in Block A145 which is termed DISPLX. The DISPLX routine converts the contents to BCD representation and displays the revolutions per minute of the pump head on the display 174 before returning to another portion of the main loop.

If the total volume mode is set in the switch 164 as determined by Block A106, then a subroutine to display that the total volume, DVOL, is called in Block A120. The subroutine DVOL loads the contents of the three bytes of the memory location ACCUM into the registers which the display routine DISPLX uses as input. Therefore the execution of DVOL in Block A120 and the subsequent transfer of control to DISPLX in Block A145 causes the display of the contents of the memory location ACCUM. This sequence displays the total accumulated volume in either milliliters or hundredths of milliliters depending upon the flow mode and range setting.

Next in Block A108 the program determines whether the apparatus is being used as a flow meter or a dispenser. If the device is a flow meter then there is no need to display the parameter representing the number of batches dispensed. Therefore, if the program determines the apparatus is a flow meter, the program defaults to Block A144 where the last possible choice of display is the flow rate. The subroutine that is called in block A144 is labeled DCAL and is basically used to read the value of the measured parameter stored in memory location ARPM and divide it by the calibration constant CALM to yield a flow rate. The calculated flow rate is then loaded into the registers which are used as input to the display routine DISPLX. Therefore, after the flow rate has been calculated and control of the program has been transferred to Block A145, the display of the apparatus is loaded with the flow rate in milliliters per minute.

If the device is not a flow meter, then in Block A110 the display mode indicator switch 164 is tested to determine whether its position is requesting the display of the flow rate. If an affirmative result is found, then the loop just described for calling the subroutines DCAL and DISPLX are executed by transferring control to Blocks A144 and A145, respectively. If the position of the display mode indicator switch is none of the previous positions, then the operator must be requesting the number of the batch being dispensed and the program defaults to Block A112 where the subroutine DBATCH is called. The DBATCH subroutine displays the current number of the batch which is presently in processing or if all batches have been dispensed it will display the message "donE".

Returning now to Block A100, if the system is not calibrated then the path the program follows is to Block A116 where the display mode indicator switch 164 is read and tested to determine its position. In Block A122 a test is performed to detect whether the display mode indicator is in the display RPM position. If this test is positive, then control is transferred to Block A118. This will produce a normal display of the RPM as described previously. This is possible because the non-calibration of the apparatus does not affect the direct reading of revolutions per minute of the pump motor.

If the position of the switch is not requesting the display the RPM, then in Block A124 a test is performed to determine if the present display indicator switch position is the same as the last switch position read by the system. If it is, then the apparatus automatically returns to the main loop because the display will be showing the same message as is requested by this iteration. If not, the program branches to Block A126 where the present display mode indicator switch position is loaded into the last switch position. Next in Block A128 the decimal point flag is set and the program continues to Block A130.

In that Block the test for the total volume position of the display indicator switch 164 is performed. If the display indicator switch 164 is in this position, the operator is warned of the uncalibrated state of the apparatus by calling the subroutine NOVOL in Block A134. The subroutine NOVOL displays a series of dashes on the display indicating that there is no total volume which can be indicated.

The next test in Block A132 is to determine whether the display indicator switch 164 is in the position to request the display of flow rate. If it is, then the operator is warned of the uncalibrated condition by calling the subroutine UNCAL in Block A138 which causes the display of those letters in the 5 digit display of the apparatus. The next test in Block A136 is to determine whether the apparatus is a flow meter or a dispenser. If the apparatus is a flow meter, the other positions of the display indicator switch have no meaning and the apparatus defaults to the message indicating the apparatus is uncalibrated by transferring control to Block A138. However, if the apparatus is a dispenser the program transfers control to Block A112 where the subroutine DBATCH is called. This will cause a display of the message "donE" on the LED segments for an uncalibrated state.

Figure 12A:
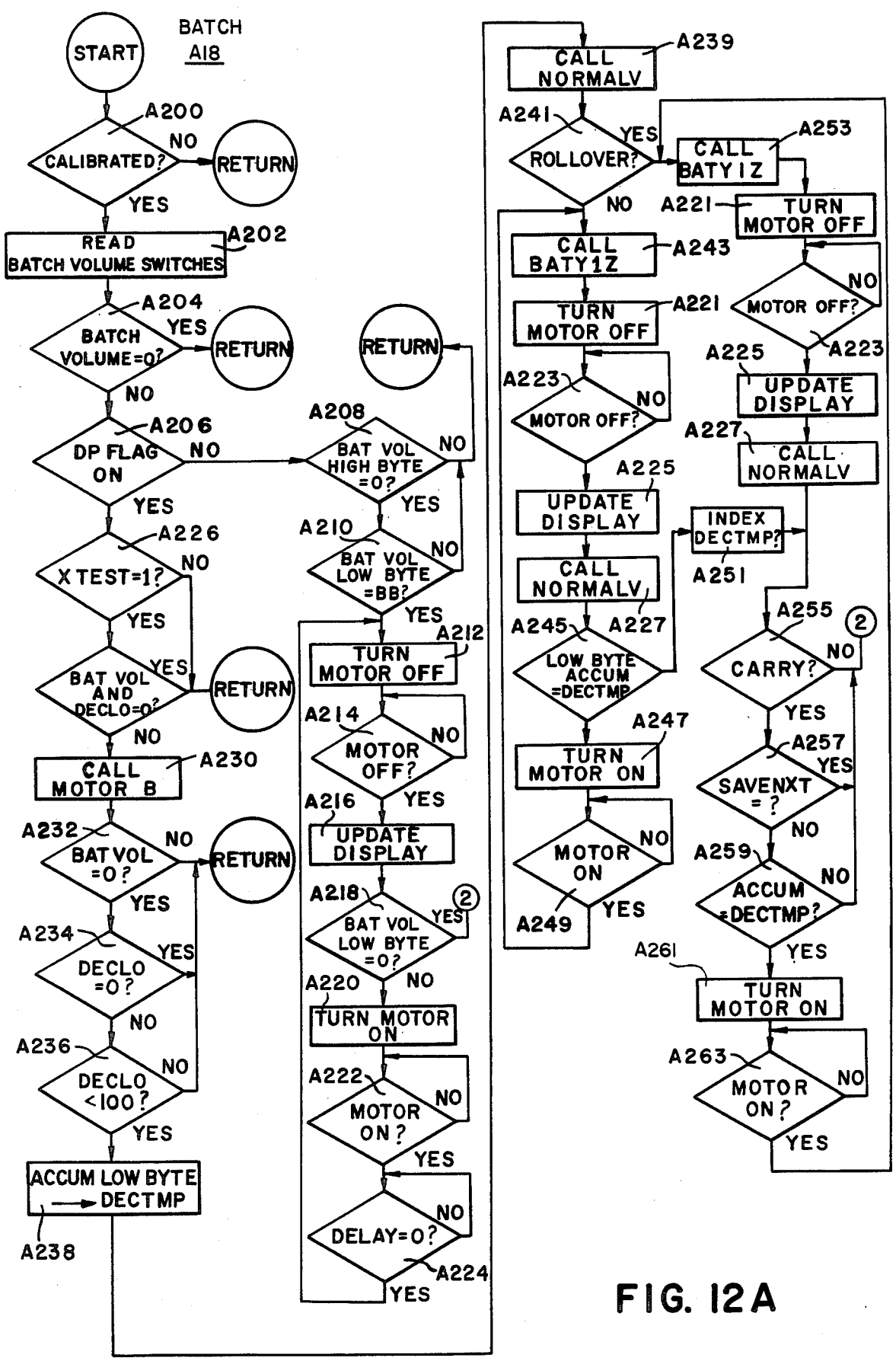
FIGS. 12A and 12B are detailed flow charts of the routine BATCH which is used to run the apparatus in batch mode and is called by the system program illustrated in FIG. 9.
Figure 12B:
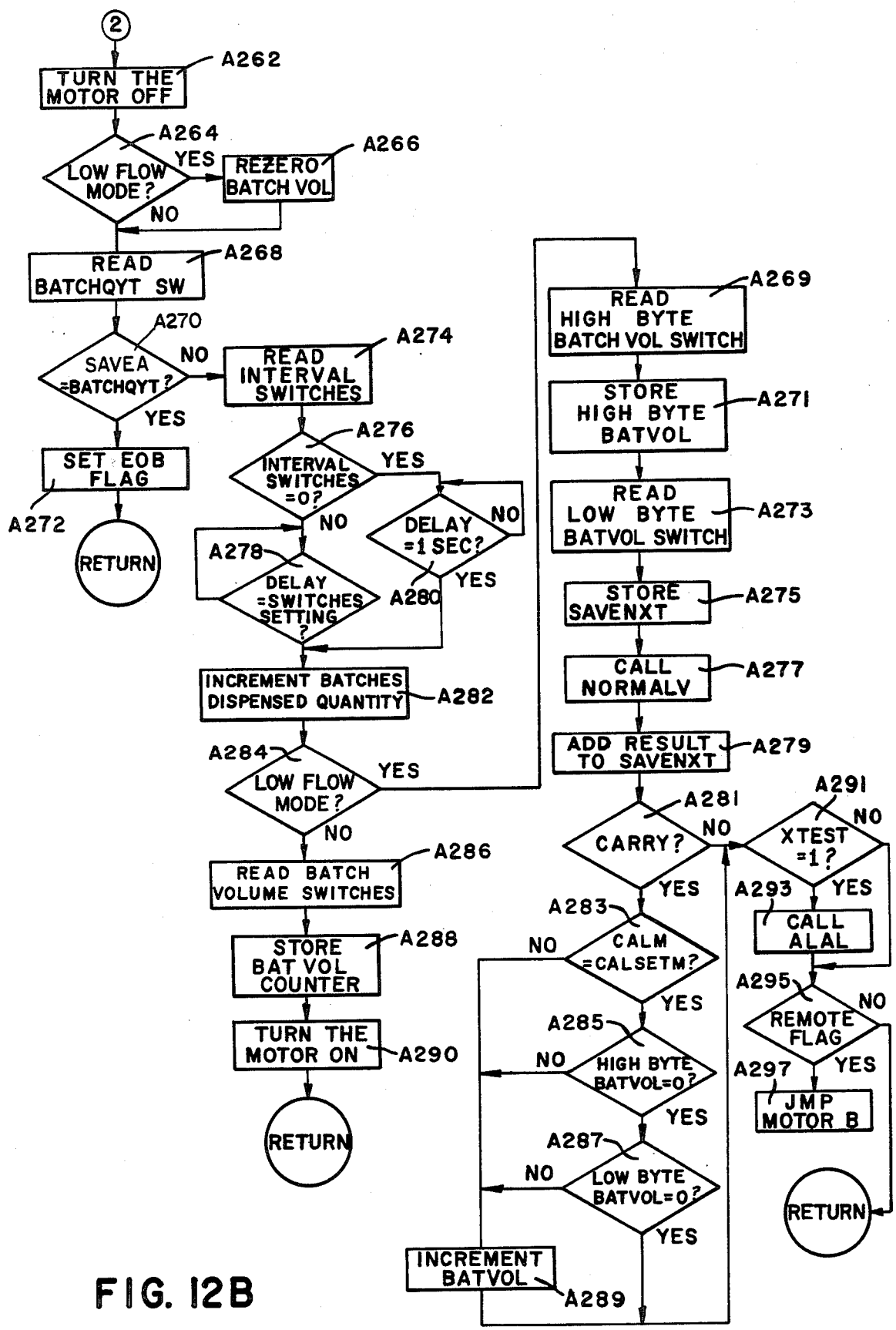

The batch routine will now be more fully described with reference to FIGS. 12A and 12B. The routine begins by determining whether the system is calibrated or not by reading the mode flag. This operation is accomplished in block A200 and, if the system is not calibrated, the routine returns to the main loop immediately as no batch dispensing operation should take place in an uncalibrated flow mode. If the device passes the calibration test, then the batch volume switches are read in block A202 and a test is performed to determine if the batch volume is set equal to zero in block A204. If the batch volume is zero then the apparatus is being used as a flow meter and the program returns to the main loop.

However, if the batch volume switches indicate a number representing the milliliters (or milliliters plus hundredths of milliliters) to be dispensed, and the system is calibrated then the program continues to block A206 to determine whether the apparatus is in a low flow or high flow mode. If the apparatus is in the low flow mode then, starting at block A226, the program will begin a sequence for a fractional milliliter dispensing path. However, if the low flow mode flag is not set, then the negative branch from block A206 begins a path at block A208 which dispenses the batch volume read from the switches in whole milliliters.

Describing the non-decimal (high flow) path first, in block A208, the high byte of the batch volume counter is tested to determine whether it is zero. If it is not, the program merely returns and fluid will be dispensed during the SWITCHES routine by turning the motor on. The program loops through this path until the batch volume quantity has been decremented sufficiently by the COUNTER interrupt routine to zero the high byte. The low byte of the batch volume counter will then be tested to determine whether or not that it is equal to the contents of memory location BB. The contents of BB is the anticipator variable and, if the low byte of the batch volume counter has not been decremented to that level, the program returns until the fluid dispensed is within a volume amount BB from the end of the batch. The value of the memory location BB, as mentioned previously, is dependent upon the speed of the motor and therefore anticipates the end of the batch volume by a variable amount.

When only the volume BB has yet to be dispensed will the affirmative branch from block A210 transfer control of the program to block A212 where the motor is turned off. As the motor coasts to a stop with dynamic braking, the next block A214 will test to determine when the motor has actually come to a halt. Thereafter, the display is updated in block A216 before continuing to a test in block A218. At this point the low byte of the batch volume counter is again tested to determine its value. If the batch volume low byte is zero then the dispensing function has been completed and the program will exit to block A262. If the low byte of the batch volume counter is not yet zero then a small amount of fluid has yet to be dispensed and the motor is turned on again in block A220. The program thereafter watches the encoder pulses to determine whether or not the motor has started and delays a short time at block A222 after it senses that the motor has started. Thereafter, a set number of motor encoder pulses are used to delay the progression of the routine in block A224 until the motor has pumped a small increment of fluid. Thereafter, the program loops back to block A212 where the motor is turned off and the sequence repeats intermittently until the batch volume low byte is zero.

In this manner, the volume dispensing operation approaches the end of a batch volume at a rapid speed and then slows down to a much slower speed when it is within a predetermined volume of the end of the batch. The motor is then jogged on and off for very short periods of time until the last small volume has been dispensed. This operation produces an accurate and rapid dispensing of a batch volume by the apparatus.

Returning now to block A206 where the test for the low flow mode was made prior to the discussion of dispensing in the high flow mode, an affirmative branch from block A206 indicates that a low flow mode is to be provided for the apparatus. The program then tests the variable XTEST to determine whether it is set indicating that not only is the apparatus in a low flow mode but a batch having a fraction of a milliliter to be dispensed is requested. If XTEST is not set than the program immediately returns as this part of the program may be bypassed. However, if a fractional dispensing operation is requested, then the affirmative branch from block A226 transfers control to block A228 where the contents of the batch volume counter and the DECLO counter are tested to determine if they are zero. If both are zero then no fractional dispensing operation need not take place and the program returns to the main loop.

If a fractional mode is needed, then the negative branch from block A228 will cause the calling of a subroutine MOTORS in block A230. The calling of the MOTORB subroutine causes one milliliter of fluid to be dispensed before the program returns. Thereafter, in block A232 the batch volume counter is again tested to determine whether the contents are zero and if not the program returns. Thus a loop is set up where the MOTORB subroutine will dispense a milliliter of fluid and then test the batch volume counter until it has been counted to zero. Once the batch volume counter is zero then the fraction in excess of the batch counter which needs to be dispensed is still contained in the counter DECLO. Initially the DECLO counter is then tested for zero contents in block A234 before transferring control to block A236. The contents of the DECLO counter is then tested in block A236 to determine if it less than 100 encoder pulses. If not the program returns to the main loop where the motor continues to run until the DECLO counter is less than this number.

Thereafter, in block A238 the low byte of the total volume counter is stored in a memory location labeled DECTMP. The amount in DECTMP is the fractional portion of the total cumulative volume is the result of adding the present total volume with the batch volume amount. This amount is then normalized to determine the amount of encoder pulses it contains by determining what percentage of the calibration constant that the fraction is. This operation is accomplished in the Block A239 where the program calls the subroutine NORMALV. The program thereafter looks for a rollover and if one has occurred, as determined by the affirmative branch from Block A241, the program calls the subroutine BATY1Z in Block A253. The subroutine BATY1Z turns the motor off in Block A221 and delays at Block A223 until it has coasted to a stop. Thereafter, the routine updates the display in Block A225 and calls the subroutine NORMALV in Block A227. This causes a recalculation of the small amount of volume which has to be dispensed taking into account the time that the motor coasted to a stop. After returning from Block A243 the program continues to Block A245 where the low byte of the total volume register ACCUM is compared with DECTMP. If the total are equal this means that the samll amount of volume for the fractional dispensing mode has been dribbled into the batch and therefore the program can exit through Block A251 after storing the value of DECTMP in the index register. If, however, the value of the low byte of the total volume register ACCUM is not equal to DECTMP then in Block A247 the program turns the motor on and until it senses that the motor has started delays in Block A249. Thereafter, the loop is established by transferring control back to Block A243 where the motor is turned off and the amount of pulses to go is updated by calling the subroutine BADY1Z.

If there has been a rollover the subroutine BATY1Z is called in Block A253 to stop the motor and update the fractional portion of a milliliter to be dispensed. The program thereafter continues along the same path as the exist from Block A251 to determine whether or not there has been a carry as determined in Block A255 or whether the variable SAVENXT equals zero in Block A257. If either of these conditions are present then the program will exit to the next function in the batch routine which is to increment the batch quantity display and to weight the predetermined interval before advancing to dispense the next batch. If the two conditions are not found then the program tests the total volume register ACCUM against the memory location DECTMP in Block A259 to determine whether the rollover has been registered in the memory. If it has the two values will not be equal and the program advances to Block A262. If the program has not determined the rollover then the motor is turned on in Block A261 and the program continues through Block A263 and back to the top of the loop at Block A253.

Continuing on with Block A262, the motor is turned off and the mode flag tested in Block A264 to determine whether the apparatus is in a low flow mode or a high flow mode. If the apparatus is in a low flow mode then a routine, as indicated by Block A266 is entered to rezero the batch volume amount. The need for this operation is caused by the slight overflow that occurs when the small increment of fluid is dispensed by the intermittent jogging of the motor. If the batch volume register and total cumulative volume register are not reset by the extra overflow pulses which are recorded in the total batch volume register, then a cumulative error will result. However, because of this re-zero routine in Block A266, this cumulative error will be zeroed every batch dispensing operation and therefore not occur.

Next in Block A268 the batch quantity switches are read and tested in Block A270 against the variable SAVEA. If these two values are equal then the dispenser has metered out the total number of batches desired by the operator. Therefore, the end of batch flag EOB is set in Block A272 and the routine exits to the main loop.

If the dispenser has not yet completed the number of batches needed to finish a run, then the negative branch from Block A270 transfers control of the program to Block A274 where the value of the interval between batches is read. This value is tested in Block A276 to determine whether it is zero. If the interval time is set equal to zero the apparatus will delay one second, as indicated in Block A280, between batches before continuing. Otherwise, in Block A278 it will delay an amount of seconds equal to the switches setting.

Thereafter, the register holding the batches dispensed quantity, SAVEA, is incremented in Block A282 before continuing to the low flow mode test in Block A284. If the apparatus is not in a low flow mode then the batch volume switches are read and stored in the batch volume counter in Block A288 before turning the motor on in Block A290 and exiting to the main loop. This will start the dispensing of a new batch for the high flow mode.

Returning now to Block A284, if the next batch is to be dispensed in a low flow mode, then a certain number of precalculations need to take place for the fractional dispensing operation to occur. These operations are accomplished by Blocks A269-A297. Initially in Blocks A269, A271, A273 and A275 the high and low bytes of the batch volume switches are stored in the batch volume counter BATVOL and the register location SAVENXT, respectively. Thereafter in Block A277 the subroutine NORMALV is called to determine the number of encoder pulses contained in low byte of the total volume register. This result is added to the value stored in SAVNXT in Block A279 to determine a fractional amount which is the result of adding the cumulative volume to this point to the batch volume. In Block A281 it is determined whether there has been a carry from the addition and, if an affirmative result occurs, control continues at Block A283.

Thereafter, because of the carry, the batch volume register BATVOL is incremented in Block A289 unless the batch volume register is equal to zero as tested for in Block A285 and Block A287. If there is no carry, the program continues to Block A291 where the program determines if the fractional dispensing test variable XTEST is set. If not, the program bypasses Block A293 and transfers control to Block A295 where the remote flag is tested for. If the remote flag is set, the program transfers the control to the motor on routine MOTORB from Block A297. Alternatively if the remote flag is off, the program returns to the main loop for further processing. If a fractional dispensing mode is detected by the variable XTEST being set in Block A291 then the subroutine ALAL is called in Block A293 before progressing to Block A295. The subroutine ALAL calculates the number of pulses needed to dispense the fractional amount which was calculated by adding the total volume to the next batch quantity. This number is stored in the increment register DECLO before the routine returns to the present path.

Figure 13:
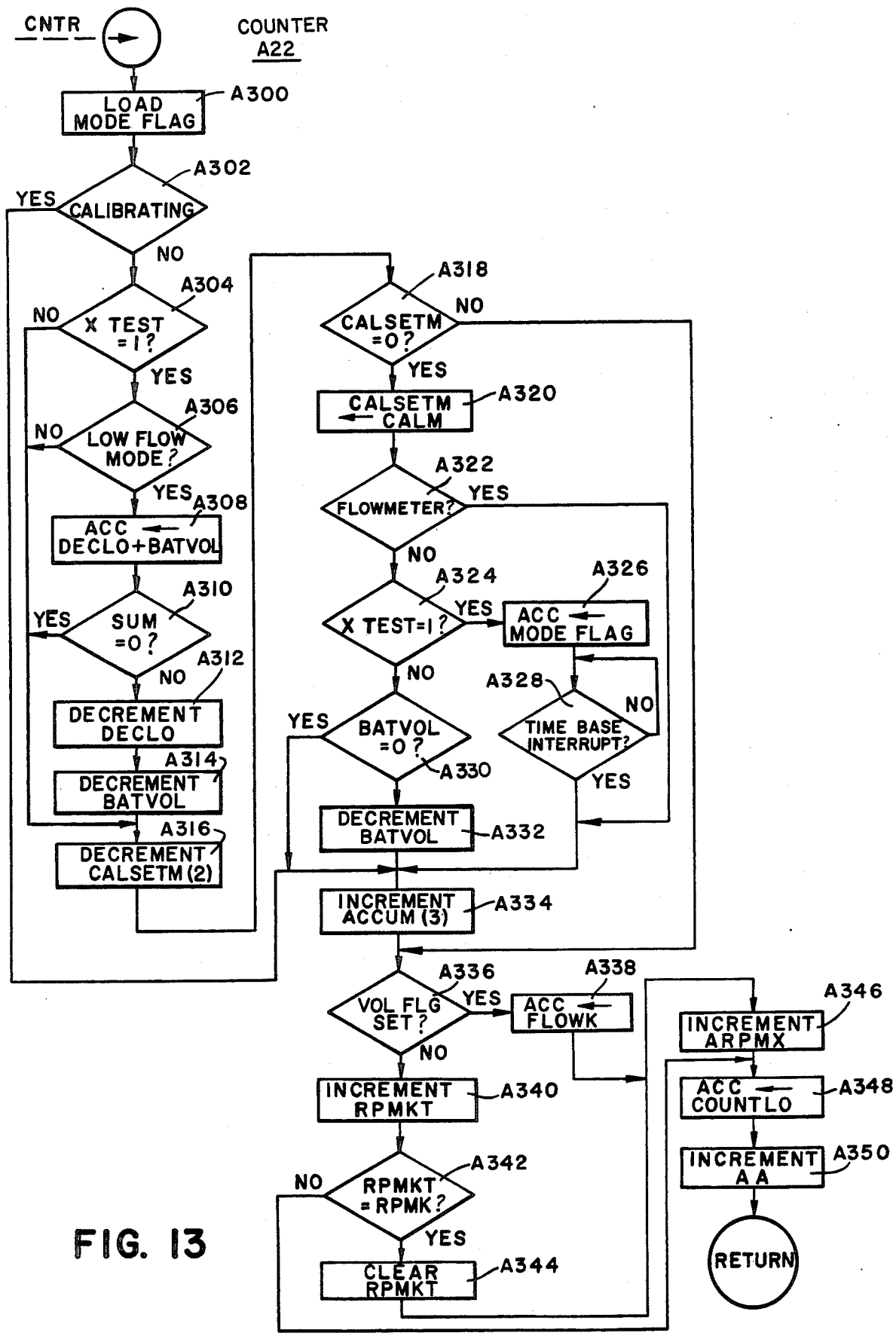
FIG. 13 is a detailed flow chart of the interrupt routine COUNTER which is called by the system program illustrated in FIG. 9.

With respect now to FIG. 13 there is shown a detailed flowchart of the counter interrupt routine A22. Each encoder pulse or the number of encoder pulses which have been prescaled causes a transfer of control from the main program to the beginning of the routine at Block A300. At that operational block, the mode flag is loaded into the accumulator so that it can be tested to determine whether the apparatus is in a calibrating mode in block A302. Based on the results of that test, the program either transfers control to Block A304 or Block A334.

If the apparatus is being calibrated, as sensed by the affirmative branch from Block A302, then the prescaler encoder pulses should be accumulated to provide a total calibration count for the division by the calibration volume necessary to calculate the calibration constant CALM. This is done by incrementing the total accumulated volume register ACCUM in block A334. Thus, for every pass through the counter routine, the interrupts are accumulated in the register ACCUM where they can be read during the calibration step, after the operator has stopped the apparatus and has input the calibration volume total.

If, however, the system is already calibrated, the path from Block A302 is to Block A304 where the variable XTEST is tested to determine if it is equal to 1. The variable XTEST is used to indicate a fractional dispensing operation for the low flow mode. If the results of this test are affirmative, then the program control is transferred to Block A306 and if negative then to Block A316. Because the XTEST variable indicates a fractional entry of a milliliter which must be dispensed in the low flow mode, Blocks A306-A314 are used to perform the operations necessary for the dispensing of this small amount of fluid by the apparatus in the dispenser mode. Thus, if the test is positive, the apparatus in Block A306 checks to determine if there is a low flow mode and the apparatus is calibrated correctly for dispensing those small amounts. If the answer to both of these tests are positive, then in Block A308 the incremental counter register labeled DECLO and the batch volume register labeled BATVOL are combined and the sum of the contents are the two registers placed in the accumulator. Next in Block A310, the accumulator sum is tested to determine if the result is zero. If the result is zero then the next two steps in the routine are bypassed and control is transferred to Block A316. However, if the sum is not yet zero then in Block A312 and A314 the DECOL register and BATVOL register are decremented respectively.

Thereafter, a series of Blocks A316-A320 are used to count the number of prescaled encoder pulses necessary to equal the calibration constant which is stored in the memory location labeled CALM. First, in Block A316, the counter register labeled CALSETM is decremented and the results of that tested in Block A318 to determine if the contents of the register are zero. If the register has not yet been reduced to zero, the program branches to Block A336, and if the register is zero, the program proceeds to Block A320. When the program reaches Block A320 and the counter register CALSETM is zero, this indicates that the number of prescaled encoder pulses equal to the calibration constant have been accumulated. The accumulation is then equal to a preset volume, in the preferred illustration one milliliter, and this fact is recorded by incrementing the total volume accumulator ACCUM in Block A334. Prior to this operation, however, the counter register CALSETM is reloaded with the calibration constant CALM in Block A320. To determine whether the apparatus is a dispenser, block A322 tests the flow meter variable and, if the apparatus is not a dispenser, increments the total accumulated volume in the counter register ACCUM immediately by jumping to Block A334.

However, if the apparatus is a dispenser the program continues to Block A324 where the variable XTEST is again tested to determine whether it is set. If this variable is set then a fractional amount of a milliliter of fluid is dispensed and since the batch volume counter register BATVOL and the additional fraction register DECLO have already been decremented, the program continues to Block A326 where the mode flag is stored in the accumulator. The program then waits for another interrupt in Block A328 before proceeding to Block A334 where the total volume counter register ACCUM is incremented. If the test in Block A324 is negative indicating that this is a regular mode and not a fractional dispensing mode, then the program continues to Block A330 where the batch volume counter register BATVOL is tested. If the contents of the batch volume register are zero then the program continues to Block A334, and if not zero, decrements the register in Block A332.

After the total volume register ACCUM and the batch volume register BATVOL have been serviced, the program executes Block A336 where the volume flag is tested. If the volume flag is set this indicates that the mode indicator switch 164 is in a display flow rate mode and thus the encoder counters have to be multiplied by the flow rate constant FLOWK. Therefore, the program transfers control Block A338 where the accumulator is loaded with the flow constant FLOWK before continuing to Block A346 where the encoder counter register ARMX is incremented. The accumulator is then loaded with the variable COUNTLO in Block A348 before the program executes Block 350. In that block the location labeled AA is incremented before leaving the routine. The variable stored in the Block AA is the anticipator variable and is used to anticipate the end of a dispensing volume for accuracy.

For an RPM display, the negative branch from Block A336 transfers control to Block A340 where the intermediate counter RPMKT is incremented. This intermediate counter accumulates pulses every interrupt and thus is merely counting prescaled encoder pulses. Next, the contents of RPMKT are compared with the counter constant RPMK in Block A342. If they are equal the program has determined that a count equal to the revolution per minute has occurred and thus the encoder counter register ARPMX should be incremented in Block A346. Prior to this incrementation, the intermediate counter RPMKT is cleared in Block A344 so the process can repeat. If, however, the intermediate counter has not been filled to equal the constant RPMK then the negative branch of Block A342 bypasses the incrementing of the encoder counter register ARPMX and transfers control to Block A348.

Figure 14:
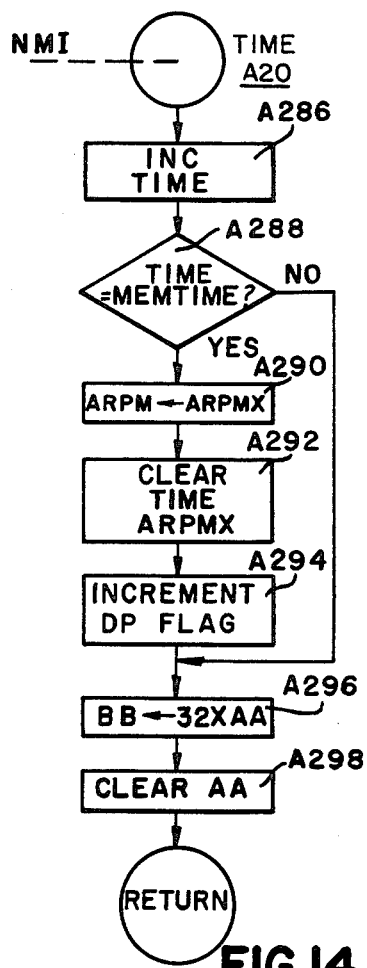
FIG. 14 is a detailed flow chart of the interrupt routine TIME which is called by the system program illustrated in FIG. 9.

The interrupt routine TIME is more fully detailed in FIG. 14. This interrupt routine receives time base interrupts from the non-maskable interrupt input *NMI and divides these interrupts by the time constant MEMTIME. When an interval of MEMTIME interrupts have occurred, then the accumulator register is transferred to the output register. The interrupt routine is entered upon the occurrence of an NMI interrupt through block A286 where the register counter labeled TIME Is incremented. Next, the program compares the contents of the register TIME to the time constant MEMTIME in block 288. If they are not equal, meaning that the interval has not been completed, then the program branches around the next three operations to block A296 where the contents of register AA are multiplied by 32 and transferred to the memory location labeled BB. The program then clears the memory location AA in block A298 before returning. The number stored in BB is essentially representative of the number of encoder interrupts happening during a single timing interval and is a measure of the speed of the motor. As previously mentioned, this number is used in the calculation of the anticipator constant for the dispensing mode of operation.

Returning to block A288, if the time interval has elapsed an affirmative branch from the block transfers control to block A290 where the accumulator ARMX is transferred into the output register ARPM. This operation occurs whether or not the display is in the flow rate or speed display modes. Thereafter, in block A292 the registers TIME and ARMPMX are cleared for the next timing cycle. The program then increments the decimal point flag in block A294 before continuing to block A296.

While a preferred embodiment of the invention has been illustrated and described, it will be obvious to those skilled in the art that various modifications and changes may be made thereto without departing from the spirit and scope of this invention as defined in the appended claims.

What is claimed is:

1. A control apparatus for a peristaltic pump having a housing with an internal chamber and a pair of openings communicating with the chamber, a length of tube extending through one opening and out the other and having a portion looped internally in the chamber so as to form a continuous flow passage through the tube, displacement means supported within the chamber and operatively associated with the tube to perform a peristaltic pumping action within the tube by deforming the tube, and a motor to rotate the displacement means and cause the deformation; said control apparatus comprising:

means for sensing the actual angular velocity of the motor and for generating a motor speed signal indicative of said actual velocity;

means for generating a desired velocity signal;

means for comparing said actual velocity signal and said desired velocity signal and for generating an error signal of one logic level if said actual velocity is greater than said desired velocity and for generating said error signal as another logic level if said desired velocity is greater than said actual velocity;

means for controlling the velocity of said motor in a direction tending to null the difference between said actually velocity and said desired velocity;

programmed microprocessor means for alternatively setting said desired velocity signal to zero or said desired value; said microprocessor means being responsive to a stored set of instructions and a plurality of switch inputs producing mode commands; and said switch input including a run switch to turn the motor on, a stop switch to turn the motor off, and a mode switch to determine the operational function of the apparatus; wherein said operational functions include using the apparatus as an uncalibrated flowmeter, a calibrated flowmeter, or a calibrated dispenser.

2. A control apparatus as set forth in claim 1 wherein said switch inputs further include batch switches including:
- a volume switch describing a predetermined volume for each batch; and
- a batch number switch describing the number of batches to be dispensed.

3. A control apparatus as set forth in claim 2 wherein said batch switches further include:
- interval switches for indicating the length of a pause between the dispensing of each batch.

4. A control apparatus as set forth in claim 3 which further includes:
- mode control means for automatically switching said apparatus between the functional operations of a flowmeter and a dispenser based upon at least one switch setting of said batch switches.

5. A control apparatus as set forth in claim 4 wherein:
- said mode control apparatus is responsive to setting a zero volume in said batch volume switches to control said apparatus in a flowmeter functional operation.

6. A control apparatus for a positive displacement pump including a motor which rotates a positive displacement means to pump a determinable amount of fluid for a definable amount of angular rotation, said control apparatus comprising:
- means for generating incremental pulses at a frequency indicative of increments of angular rotation of said motor;
- a time base generator for periodically generating time base pulses at a predetermined rate;
- means for controlling the speed of the pump head to a desired velocity value from input by an operator; and
- programmed microprocessor means for alternatively setting said desired velocity to a zero value or said desired value, said microprocessor means being responsive to a stored set of instructions and a plurality of switch inputs producing mode commands;

said microprocessor means adapted to read said time base pulses and said incremental pulses to determine at least the rotational velocity of said displacement means; and said microprocessor including mode control means for switching control of said apparatus between different means for generating operational functions, in response to different mode commands from said switch inputs, said function generating means including means for calibrating the fluid flow of said pump to determine the amount of fluid pumped for an increment of angular motor rotation, and means for controlling said apparatus as a calibrated flowmeter.

7. A control apparatus as defined in claim 6 wherein said batch dispensing controlling means further includes:
- means for inputting to said microprocessor an interval delay; and
- means for delaying said dispensing means for said interval delay between batches.

8. A control apparatus as defined in claim 6 which further includes a means for controlling said pump as a batch dispenser.

9. A control apparatus as defined in claim 6 wherein said calibrating means calculates a calibration constant in units of increments of angular rotation of the motor for a predetermined volume.

10. A control apparatus as defined in claim 9 which further includes:
- display means for displaying operating parameters of the apparatus; and
- means for enabling the display of said calibration constant.

11. A control apparatus as defined in claim 10 which further includes:
- means for enabling the display of said rotational velocity.

12. A control apparatus defined in claim 9 which further includes:
- means for calculating the flow rate of said pump from said angular rotation and said time base.

13. A control apparatus as defined in claim 9 which further includes:
- means for calculating total cumulative volume from said calibration constant and said rotational velocity.

14. A control apparatus for a positive displacement pump including a motor which rotates a positive displacement means to pump a determinable amount of fluid for a definable amount of angular rotation, said control apparatus comprising:
- means for generating incremental pulses at a frequency indicative of increments of angular rotation of said motor;
- a time base generator for periodically generating time base pulses at a predetermined rate;
- means for controlling the speed of the pump to a desired velocity value from input by an operator; and
- programmed microprocessor means for alternatively setting said desired velocity to a zero value of said desired value, said microprocessor means being responsive to a stored set of instructions and a plurality of switch inputs producing mode commands;

said microprocessor means adapted to read said time base pulses and said incremental pulses to determine at least the rotational velocity of said displacement means;

said microprocessor means including means for calibrating the fluid flow of said pump to determine the amount of fluid pumped for an increment of angular motor rotation; and said microprocessor means also including means for controlling said pump as a batch dispenser having means for inputting to said microprocessor means the number of batches to be dispensed, means for inputting to said microprocessor means the amount in each of said batches to be dispensed, and means for dispensing the number of batches input in the volumes of the amount input comprising means for measuring the amount which has already been dispensed in a batch and for stopping at an intermediate volume before reaching the amount to be dispensed, and means for intermittently turning said motor off and on until the amount to be dispensed is reached.

15. A control apparatus as defined in claim 14 wherein:
said intermediate volume before said amount to be dispensed is variable with respect to an operating parameter of the apparatus.

16. A control apparatus as defined in claim 15 wherein: p1 said operating parameter which said intermediate volume depends on is the angular velocity of said motor.

17. A control apparatus as defined in claim 14 wherein:
the amount of time said motor is turned on during intermittent dispensing is variable with respect to an operating parameter of the apparatus.

18. A control apparatus as defined in claim 17 wherein:
said operating parameter which said motor on time depends is the amount of fluid pumped for an increment of angular rotation.

19. A control apparatus as defined in claim 14 which further includes:
means for starting said motor slowly; and
means for stopping said motor quickly.

20. A control apparatus as defined in claim 19 wherein said stopping means includes:
a dynamic brake which places an electrical impedance in parallel with the motor when said control commands the motor to be turned off such that inductive energy contained in the motor is shunted to ground.

* * * * *

UNITED STATES PATENT AND TRADEMARK OFFICE
CERTIFICATE OF CORRECTION

PATENT NO. : 4,715,786

DATED : December 29, 1987

INVENTOR(S) : DONALD L. WOLFF, ET AL.

It is certified that error appears in the above-identified patent and that said Letters Patent is hereby corrected as shown below:

Column 3, line 24, change "2" to --3--;

Column 4, line 41, change "manipulating" to --manipulation--;

Column 5, line 51, after "the" first occurrence) insert --fluid--;

Column 6, line 10, change "moiunting" to --mounting--;

Column 24, line 47, change "samll" to --small--;

Column 26, line 14, change "theremote" to --the remote--;

Column 28, line 6, change "the" to --one--;

Column 28, line 25, change "Is" to --is--;

Column 30, line 62, change "of" to --or--;

Column 32, line 2, delete "pl";

Signed and Sealed this

Twentieth Day of March, 1990

Attest:

JEFFREY M. SAMUELS

Attesting Officer

Acting Commissioner of Patents and Trademarks